(12) United States Patent
Danilov et al.

(10) Patent No.: US 11,288,229 B2
(45) Date of Patent: Mar. 29, 2022

(54) VERIFIABLE INTRA-CLUSTER MIGRATION FOR A CHUNK STORAGE SYSTEM

(71) Applicant: EMC IP Holding Company LLC, Hopkinton, MA (US)

(72) Inventors: Mikhail Danilov, Saint Petersburg (RU); Mikhail Edkov, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 98 days.

(21) Appl. No.: 16/888,144

(22) Filed: May 29, 2020

(65) Prior Publication Data

US 2021/0374094 A1    Dec. 2, 2021

(51) Int. Cl.
*G06F 12/00* (2006.01)
*G06F 16/11* (2019.01)
(Continued)

(52) U.S. Cl.
CPC .............. *G06F 16/119* (2019.01); *G06F 3/06* (2013.01); *G06F 11/0772* (2013.01); *G06F 12/0253* (2013.01); *G06F 16/162* (2019.01); *G06F 16/1734* (2019.01); *G06F 16/1827* (2019.01); *G06F 16/2246* (2019.01); *G06F 16/2282* (2019.01)

(58) Field of Classification Search
CPC .. G06F 16/119; G06F 16/162; G06F 16/2246; G06F 16/2282; G06F 16/1827; G06F 16/1734; G06F 3/06; G06F 3/0646; G06F 3/0647; G06F 3/065; G06F 11/0772; G06F 12/0253
See application file for complete search history.

(56) References Cited

U.S. PATENT DOCUMENTS

| 5,675,802 A | 10/1997 | Allen et al. |
| 5,805,788 A | 9/1998 | Johnson |

(Continued)

OTHER PUBLICATIONS

Non-Final Office Action received for U.S. Appl. No. 16/209,185 dated Jun. 18, 2020, 22 pages.

(Continued)

*Primary Examiner* — Shawn X Gu
(74) *Attorney, Agent, or Firm* — Amin, Turocy & Watson, LLP

(57) ABSTRACT

Verifiable intra-cluster migration (VICM) for a chunk storage system is disclosed. VICM can migrate data from a first portion of a cluster to a second portion of a cluster. VICM can comprise locking a first portion of a cluster and locking a corresponding first cluster table during a preparation phase. Chunks of the first portion can then be migrated, during a migration phase, to the second portion and a second cluster table, corresponding to the second portion, can be updated accordingly. Garbage management operations, including recovery operations, can be performed via the second cluster table and the second portion during the migration phase. Upon completion of the migration phase, a reconciliation phase can comprise verifying chunk relationships of the second cluster table and the second portion based on the first cluster table. Exceptions to the verification can be reported via an exception report.

20 Claims, 10 Drawing Sheets

(51) Int. Cl.
  *G06F 16/16* (2019.01)
  *G06F 16/17* (2019.01)
  *G06F 11/07* (2006.01)
  *G06F 16/22* (2019.01)
  *G06F 12/02* (2006.01)
  *G06F 16/182* (2019.01)
  *G06F 3/06* (2006.01)

(56) References Cited

U.S. PATENT DOCUMENTS

| | | | |
|---|---|---|---|
| 5,950,225 A | 9/1999 | Kleiman | |
| 6,073,218 A | 6/2000 | Dekoning et al. | |
| 6,108,684 A | 8/2000 | Dekoning et al. | |
| 6,240,527 B1 | 5/2001 | Schneider et al. | |
| 6,502,243 B1 | 12/2002 | Thomas | |
| 7,103,884 B2 | 9/2006 | Fellin et al. | |
| 7,389,393 B1 | 6/2008 | Karr et al. | |
| 7,577,091 B2 | 8/2009 | Antal et al. | |
| 7,631,051 B1 | 12/2009 | Fein et al. | |
| 7,653,792 B2 * | 1/2010 | Shimada | G06F 3/0622 711/152 |
| 7,664,839 B1 | 2/2010 | Karr et al. | |
| 7,680,875 B1 | 3/2010 | Shopiro et al. | |
| 7,694,191 B1 * | 4/2010 | Bono | G06F 11/004 714/48 |
| 7,721,044 B1 | 5/2010 | Chatterjee et al. | |
| 8,125,406 B1 | 2/2012 | Jensen et al. | |
| 8,261,033 B1 | 9/2012 | Slik et al. | |
| 8,370,542 B2 | 2/2013 | Lu et al. | |
| 8,479,037 B1 | 7/2013 | Chatterjee et al. | |
| 8,495,465 B1 | 7/2013 | Anholt et al. | |
| 8,504,518 B1 | 8/2013 | Ghemawat et al. | |
| 8,540,625 B2 | 9/2013 | Miyoshi | |
| 8,683,205 B2 | 3/2014 | Resch et al. | |
| 8,751,599 B2 | 6/2014 | Tran et al. | |
| 8,751,740 B1 | 6/2014 | De Forest et al. | |
| 8,751,897 B2 | 6/2014 | Borthakur et al. | |
| 8,799,746 B2 | 8/2014 | Baker et al. | |
| 8,832,234 B1 | 9/2014 | Brooker et al. | |
| 8,856,619 B1 | 10/2014 | Cypher | |
| 8,856,624 B1 | 10/2014 | Paniconi | |
| 8,972,478 B1 | 3/2015 | Storer et al. | |
| 9,003,086 B1 | 4/2015 | Schuller et al. | |
| 9,021,296 B1 | 4/2015 | Kiselev et al. | |
| 9,037,825 B1 | 5/2015 | Donlan et al. | |
| 9,052,942 B1 | 6/2015 | Barber et al. | |
| 9,063,838 B1 | 6/2015 | Boyle et al. | |
| 9,098,447 B1 | 8/2015 | Donlan et al. | |
| 9,208,009 B2 | 12/2015 | Resch et al. | |
| 9,218,135 B2 | 12/2015 | Miller et al. | |
| 9,244,761 B2 | 1/2016 | Yekhanin et al. | |
| 9,268,783 B1 | 2/2016 | Shilane et al. | |
| 9,274,903 B1 | 3/2016 | Garlapati et al. | |
| 9,280,430 B2 | 3/2016 | Sarfare et al. | |
| 9,405,483 B1 | 8/2016 | Wei et al. | |
| 9,477,682 B1 | 10/2016 | Bent et al. | |
| 9,495,241 B2 | 11/2016 | Flynn et al. | |
| 9,619,256 B1 | 4/2017 | Natanzon et al. | |
| 9,641,615 B1 | 5/2017 | Robins et al. | |
| 9,665,428 B2 | 5/2017 | Vairavanathan et al. | |
| 9,747,057 B1 | 8/2017 | Ramani et al. | |
| 9,817,713 B2 | 11/2017 | Gupta et al. | |
| 9,864,527 B1 | 1/2018 | Srivastav et al. | |
| 9,942,084 B1 | 4/2018 | Sorenson, III | |
| 10,001,947 B1 | 6/2018 | Chatterjee et al. | |
| 10,007,561 B1 | 6/2018 | Pudipeddi et al. | |
| 10,055,145 B1 | 8/2018 | Danilov et al. | |
| 10,061,668 B1 | 8/2018 | Lazier et al. | |
| 10,108,819 B1 | 10/2018 | Donlan et al. | |
| 10,127,234 B1 | 11/2018 | Krishnan et al. | |
| 10,216,770 B1 | 2/2019 | Kulesza et al. | |
| 10,242,022 B1 | 3/2019 | Jain et al. | |
| 10,282,262 B2 | 5/2019 | Panara et al. | |
| 10,289,488 B1 | 5/2019 | Danilov et al. | |
| 10,331,516 B2 | 6/2019 | Danilov et al. | |
| 10,361,810 B2 | 7/2019 | Myung et al. | |
| 10,387,546 B1 | 8/2019 | Duran et al. | |
| 10,496,330 B1 | 12/2019 | Bernat et al. | |
| 10,503,611 B1 | 12/2019 | Srivastav et al. | |
| 10,567,009 B2 | 2/2020 | Yang et al. | |
| 10,579,490 B2 | 3/2020 | Danilov et al. | |
| 10,613,780 B1 | 4/2020 | Naeni et al. | |
| 10,628,043 B1 | 4/2020 | Chatterjee et al. | |
| 10,644,408 B2 | 5/2020 | Sakai et al. | |
| 10,705,911 B2 | 7/2020 | Vishnumolakala et al. | |
| 10,733,053 B1 | 8/2020 | Miller et al. | |
| 10,740,183 B1 | 8/2020 | Blaum et al. | |
| 10,797,863 B2 | 10/2020 | Chen et al. | |
| 10,846,003 B2 | 11/2020 | Danilov et al. | |
| 2002/0166026 A1 | 11/2002 | Ulrich et al. | |
| 2002/0191311 A1 | 12/2002 | Ulrich et al. | |
| 2005/0071546 A1 | 3/2005 | Delaney et al. | |
| 2005/0080982 A1 | 4/2005 | Vasilevsky et al. | |
| 2005/0088318 A1 | 4/2005 | Liu et al. | |
| 2005/0108775 A1 | 5/2005 | Bachar et al. | |
| 2005/0140529 A1 | 6/2005 | Choi et al. | |
| 2005/0234941 A1 | 10/2005 | Watanabe | |
| 2006/0047896 A1 | 3/2006 | Nguyen et al. | |
| 2006/0075007 A1 | 4/2006 | Anderson et al. | |
| 2006/0143508 A1 | 6/2006 | Mochizuki et al. | |
| 2006/0265211 A1 | 11/2006 | Canniff et al. | |
| 2007/0076321 A1 | 4/2007 | Takahashi et al. | |
| 2007/0239759 A1 | 10/2007 | Shen et al. | |
| 2007/0250674 A1 | 10/2007 | Findberg et al. | |
| 2008/0222480 A1 | 9/2008 | Huang et al. | |
| 2008/0222481 A1 | 9/2008 | Huang et al. | |
| 2008/0244353 A1 | 10/2008 | Dholakia et al. | |
| 2008/0320061 A1 | 12/2008 | Aszmann et al. | |
| 2009/0070771 A1 | 3/2009 | Yuyitung et al. | |
| 2009/0113034 A1 | 4/2009 | Krishnappa et al. | |
| 2009/0172464 A1 | 7/2009 | Byrne et al. | |
| 2009/0183056 A1 | 7/2009 | Aston | |
| 2009/0204959 A1 | 8/2009 | Anand et al. | |
| 2009/0240880 A1 | 9/2009 | Kawaguchi | |
| 2009/0259882 A1 | 10/2009 | Shellhamer | |
| 2010/0031060 A1 | 2/2010 | Chew et al. | |
| 2010/0094963 A1 | 4/2010 | Zuckerman et al. | |
| 2010/0174968 A1 | 7/2010 | Charles et al. | |
| 2010/0218037 A1 | 8/2010 | Swartz et al. | |
| 2010/0293348 A1 | 11/2010 | Ye et al. | |
| 2010/0332748 A1 | 12/2010 | Van der Goot et al. | |
| 2011/0029836 A1 | 2/2011 | Dhuse et al. | |
| 2011/0106972 A1 | 5/2011 | Grube et al. | |
| 2011/0107165 A1 | 5/2011 | Resch et al. | |
| 2011/0138148 A1 | 6/2011 | Friedman et al. | |
| 2011/0161712 A1 | 6/2011 | Athalye et al. | |
| 2011/0196833 A1 | 8/2011 | Drobychev et al. | |
| 2011/0246503 A1 | 10/2011 | Bender et al. | |
| 2011/0292054 A1 | 12/2011 | Boker et al. | |
| 2012/0023291 A1 | 1/2012 | Zeng et al. | |
| 2012/0096214 A1 | 4/2012 | Lu et al. | |
| 2012/0191675 A1 | 7/2012 | Kim et al. | |
| 2012/0191901 A1 | 7/2012 | Norair | |
| 2012/0204077 A1 | 8/2012 | D'Abreu et al. | |
| 2012/0233117 A1 | 9/2012 | Holt et al. | |
| 2012/0311395 A1 | 12/2012 | Leggette et al. | |
| 2012/0317234 A1 | 12/2012 | Bohrer et al. | |
| 2012/0321052 A1 | 12/2012 | Morrill et al. | |
| 2013/0047187 A1 | 2/2013 | Frazier et al. | |
| 2013/0054822 A1 | 2/2013 | Mordani et al. | |
| 2013/0067159 A1 | 3/2013 | Mehra | |
| 2013/0067187 A1 | 3/2013 | Moss et al. | |
| 2013/0088501 A1 | 4/2013 | Fell | |
| 2013/0097470 A1 | 4/2013 | Hwang et al. | |
| 2013/0145208 A1 | 6/2013 | Yen et al. | |
| 2013/0238932 A1 | 9/2013 | Resch | |
| 2013/0246876 A1 | 9/2013 | Manssour et al. | |
| 2013/0290482 A1 | 10/2013 | Leggette | |
| 2013/0305365 A1 | 11/2013 | Rubin et al. | |
| 2014/0040417 A1 | 2/2014 | Galdwin et al. | |
| 2014/0064048 A1 | 3/2014 | Cohen et al. | |
| 2014/0115182 A1 | 4/2014 | Sabaa et al. | |
| 2014/0149794 A1 | 5/2014 | Shetty et al. | |

(56) References Cited

U.S. PATENT DOCUMENTS

| | | |
|---|---|---|
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson et al. |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2014/0380126 A1 | 12/2014 | Yekhanin et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0160872 A1 | 6/2015 | Chen |
| 2015/0178007 A1 | 6/2015 | Moisa et al. |
| 2015/0186043 A1 | 7/2015 | Kesselman et al. |
| 2015/0269025 A1 | 9/2015 | Krishnamurthy et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2015/0378542 A1 | 12/2015 | Saito et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0085645 A1 | 3/2016 | Buzzard et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0253400 A1 | 9/2016 | McAlister et al. |
| 2016/0277497 A1 | 9/2016 | Bannister et al. |
| 2016/0292429 A1 | 9/2016 | Bannister et al. |
| 2016/0294419 A1 | 10/2016 | Sandell et al. |
| 2016/0328295 A1 | 11/2016 | Baptist et al. |
| 2016/0357443 A1 | 12/2016 | Li et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0116088 A1 | 4/2017 | Anami et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0220662 A1 | 8/2017 | Barton et al. |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0285952 A1 | 10/2017 | Danilov et al. |
| 2017/0286009 A1 | 10/2017 | Danilov et al. |
| 2017/0286436 A1 | 10/2017 | Neporada et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |
| 2018/0052744 A1 | 2/2018 | Chen et al. |
| 2018/0063213 A1 | 3/2018 | Bevilacqua-Linn et al. |
| 2018/0074881 A1 | 3/2018 | Burden |
| 2018/0121286 A1 | 5/2018 | Sipos |
| 2018/0129417 A1 | 5/2018 | Sivasubramanian et al. |
| 2018/0181324 A1 | 6/2018 | Danilov et al. |
| 2018/0181475 A1 | 6/2018 | Danilov et al. |
| 2018/0181612 A1 | 6/2018 | Danilov et al. |
| 2018/0246668 A1 | 8/2018 | Sakashita et al. |
| 2018/0267856 A1 | 9/2018 | Hayasaka et al. |
| 2018/0267985 A1 | 9/2018 | Badey et al. |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0114223 A1 | 4/2019 | Pydipaty et al. |
| 2019/0188079 A1 | 6/2019 | Kohli |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0026810 A1 | 1/2020 | Subramaniam et al. |
| 2020/0042178 A1 | 2/2020 | Danilov et al. |
| 2020/0050510 A1 | 2/2020 | Chien et al. |
| 2020/0104377 A1 | 4/2020 | Earnesty, Jr. et al. |
| 2020/0117556 A1 | 4/2020 | Zou et al. |

OTHER PUBLICATIONS

Martin Hosken, Developing a Hyper-Converged Storage Strategy for VMware vCloud Director with VMware vSAN, Jan. 2018 (Year 2018).

Non-Final Office Action received for U.S. Appl. No. 16/261,549 dated Apr. 15, 2020, 22 pages.

Non-Final Office Action received for U.S. Appl. No. 16/374,726 dated Jun. 2, 2020, 47 pages.

Natarajan, RAID 0, RAID 1, RAID 5, RAID 10 Explained with Diagrams, Aug. 10, 2010, thegeekstuff.com (18 pages).

Non-Final Office Action received for U.S. Appl. No. 16/177,285 dated Jul. 22, 2020, 31 pages.

Non-Final Office Action received for U.S. Appl. No. 16/261,547 dated Sep. 3, 2020, 26 pages.

Non-Final Office Action received for U.S. Appl. No. 16/261,548 dated Aug. 21, 2020, 42 pages.

Notice of Allowance received for U.S. Appl. No. 16/261,549 dated Jul. 17, 2020, 40 pages.

Qiang et al., "Dynamics Process of Long-running Allocation/Collection in Linear Storage Space", International Conference on Networking, Architecture, and Storage (NAS 2007), Guilin, 2007, pp. 209-216.

Non-Final Office Action received for U.S. Appl. No. 16/374,725 dated Aug. 19, 2020, 50 pages.

Non-Final Office Action received for U.S. Appl. No. 16/511,161 dated Jul. 10, 2020, 24 pages.

Notice of Allowance received for U.S. Appl. No. 15/862,547 dated Mar. 29, 2019 27 pages.

Non-Final Office Action received for U.S. Appl. No. 15/792,714 dated Apr. 4, 2019, 20 pages.

Final Office Action received for U.S. Appl. No. 15/792,714 dated Sep. 12, 2019, 43 pages.

Wikipedia "Garbage Collection", URL: https://en.wikipedia.org/wiki/Garbage_collection_(computer science) #Availability (Year: 2017) retrieved using the WayBackMachine, Sep. 8, 2017, 8 pages.

Wikipedia "Erasure code", URL: https://web.archive.org/web/20170908171158/https://en.wikipedia.org/wiki/Erasure_code (Year: 2017), retrieved using the WayBackMachine, Sep. 8, 2017, 5 pages.

Wikipedia "Front and back ends" URL: https://en.wikipedia.org/wiki/Front_and_back_ends (Year:2019), Sep. 6, 2019, 4 pages.

Notice of Allowance received for U.S. Appl. No. 15/792,714 dated Nov. 8, 2019, 31 pages.

Non-Final Office Action received for U.S. Appl. No. 15/791,390 dated Sep. 20, 2019, 27 pages.

(56) References Cited

OTHER PUBLICATIONS

Final Office Action received for U.S. Appl. No. 15/791,390 dated Feb. 6, 2020, 29 pages.
Non-Final Office Action received for U.S. Appl. No. 15/791,390 dated Apr. 30, 2020, 48 pages.
Huang et al., "Scale-RS: An Efficient Scaling Scheme for RS-Coded Storage Clusters," in IEEE Transactions on Parallel and Distributed Systems, vol. 26, No. 6, pp. 1704-1717, Jun. 1, 2015.
Non-Final Office Action received for U.S. Appl. No. 16/457,615 dated Jul. 20, 2020, 34 pages.
Non-Final Office Action received for U.S. Appl. No. 15/651,504 dated Mar. 21, 2019, 10 pages.
Non-Final Office Action received for U.S. Appl. No. 15/662,273 dated Nov. 16, 2018, 19 pages.
Final Office Action received for U.S. Appl. No. 15/662,273 dated May 15, 2019, 33 pages.
Non-Final Office Action received for U.S. Appl. No. 15/965,479 dated Apr. 15, 2019, 21 pages.
Non-Final Office Action received for U.S. Appl. No. 15/794,950 dated Jul. 9, 2019, 29 pages.
Final Office Action received for U.S. Appl. No. 15/651,504 dated Sep. 18, 2019, 15 pages.
Non-Final Office Action received for U.S. Appl. No. 15/952,179 dated Sep. 10, 2019, 42 pages.
Wikipedia, "Standard Raid Levels—RAID 6, URL: https://en.wikipedia.org/wiki/Standard_RAID_levels#RAID_6", Oct. 18, 2019, 11 pages.
Non-Final Office Action received for U.S. Appl. No. 15/656,382 dated Nov. 1, 2019, 47 pages.
Final Office Action received for U.S. Appl. No. 15/952,179 dated Nov. 26, 2019, 53 pages.
Non Final Office Action received for U.S. Appl. No. 16/024,314 dated Nov. 25, 2019, 42 pages.
Non-Final Office Action received for U.S. Appl. No. 16/177,278 dated Dec. 2, 2019, 55 pages.
Non-Final Office Action received for U.S. Appl. No. 15/651,504 dated Dec. 31, 2019, 18 pages.
Non-Final Office Action received for U.S. Appl. No. 16/010,246 dated Dec. 5, 2019, 67 pages.
Stonebreaker et al. "Distributed RAID—A New Multiple Copy Algorithm.", IEEE ICDE, 1990, pp. 430-437.
Muralidhar et al. "f4: Facebook's Warm BLOB Storage System", USENIX. OSDI, Oct. 2014, pp. 383-398.
Final Office Action dated Feb. 12, 2020 for U.S. Appl. No. 16/024,314, 29 pages.
Non-Final Office Action received for U.S. Appl. No. 16/010,255 dated Jan. 9, 2020, 31 pages.
Office Action dated Feb. 5, 2020 for U.S. Appl. No. 16/261,551, 30 pages.
Non-Final Office Action received for U.S. Appl. No. 16/228,612 dated Feb. 27, 2020, 49 pages.
Final Office Action received for U.S. Appl. No. 16/010,246 dated Mar. 16, 2020, 33 pages.
Final Office Action received for U.S. Appl. No. 15/656,382 dated Apr. 6, 2020, 31 pages.
Non-Final Office Action received for U.S. Appl. No. 15/582,167 dated Sep. 7, 2018, 19 pages.
Non-Final Office Action received for U.S. Appl. No. 15/952,179 dated Apr. 20, 2020, 68 pages.
Notice of Allowance received for U.S. Appl. No. 16/240,193, dated May 4, 2020, 46 pages.
Final Office Action received for U.S. Appl. No. 16/177,278, dated May 11, 2020, 53 pages.
Notice of Allowance received for U.S. Appl. No. 16/726,428 dated Jun. 14, 2021, 34 pages.
Non-Final Office Action received for U.S. Appl. No. 16/698,096 dated May 24, 2021, 62 pages.
Non-Final Office Action received for U.S. Appl. No. 16/745,855 dated May 13, 2021, 71 pages.
Non-Final Office Action received for U.S. Appl. No. 16/834,649 dated Jun. 24, 2021, 61 pages.
Non-Final Office Action received for U.S. Appl. No. 16/179,486 dated May 12, 2021, 50 pages.
Non-Final Office Action received for U.S. Appl. No. 16/570,657 dated May 12, 2021, 79 pages.
Non-Final Office Action received for U.S. Appl. No. 16/670,765 dated Jul. 20, 2021, 79 pages.
Thomasian et al., "Hierarchical RAID: Design, performance, reliability, and recovery", J. Parallel Distrib. Comput. vol. 72 (2012) pp. 1753-1769.
Non-Final Office Action received for U.S. Appl. No. 16/526,142 dated Oct. 15, 2020, 21 pages.
Notice of Allowance received U.S. Appl. No. 16/228,612 dated Oct. 20, 2020, 84 pages.
Zhou, et al. "Fast Erasure Coding for Data Storage: A Comprehensive Study of the Acceleration Techniques" Proceedings of the 17th Usenix Conference on File and Storage Technologies (FAST '19), [https://www.usenix.org/conference/fast19/presentation/zhou], Feb. 2019, Boston, MA, USA. 14 pages.
Non-Final Office Action received for U.S. Appl. No. 16/010,255 dated Oct. 29, 2020, 65 pages.
Final Office Action received for U.S. Appl. No. 16/240,272 dated Oct. 27, 2020, 42 pages.
Non-Final Office Action received for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Non-Final Office Action received for U.S. Appl. No. 16/570,657 dated Nov. 27, 2020, 75 pages.
Final Office Action received for U.S. Appl. No. 16/177,285 dated Dec. 30, 2020, 61 pages.
Final Office Action received for U.S. Appl. No. 16/511,161 dated Dec. 30, 2020, 61 pages.
Non-Final Office Action received for U.S. Appl. No. 16/399,895 dated Jan. 4, 2021, 64 pages.
Notice of Allowance received for U.S. Appl. No. 16/374,726 dated Jan. 6, 2021, 56 pages.
Non-Final Office Action received for U.S. Appl. No. 16/231,018 dated May 8, 2020, 78 pages.
Notice of Allowance dated May 11, 2020 for U.S. Appl. No. 16/240,193, 24 pages.
Non-Final Office Action received for U.S. Appl. No. 16/228,624 dated Jun. 24, 2020, 65 pages.
Non-Final Office Action received for U.S. Appl. No. 16/240,272 dated Jun. 29, 2020, 64 pages.
Non-Final Office Action received for U.S. Appl. No. 16/228,612 dated Jun. 29, 2020, 62 pages.
Final Office Action received for U.S. Appl. No. 16/010,255 dated Jul. 23, 2020, 36 pages.
Office Action received for U.S. Appl. No. 16/010,246 dated Jul. 27, 2020 36 pages.
Office Action received for U.S. Appl. No. 16/177,278 dated Aug. 21, 2020, 53 pages.
Office Action received for U.S. Appl. No. 16/179,486, dated Aug. 13, 2020, 64 pages.
Guo et al., "GeoScale: Providing Geo-Elasticity in Distributed Clouds" 2016 IEEE International Conference on Cloud Engineering, 4 pages.
Guo et al., "Providing Geo-Elasticity in Geographically Distributed Clouds". ACM Transactions on Internet Technology, vol. 18, No. 3, Article 38. Apr. 2018. 27 pages.
Office Action received for U.S. Appl. No. 16/254,073, dated Aug. 18, 2020, 62 pages.
Non-Final Office Action received for U.S. Appl. No. 16/399,897 dated Feb. 19, 2021, 56 pages.
Non-Final Office Action received for U.S. Appl. No. 16/670,715 dated Mar. 31, 2021, 60 pages.
Final Office Action received for U.S. Appl. No. 16/177,278 dated Feb. 24, 2021, 109 pages.

(56) References Cited

OTHER PUBLICATIONS

EMC; "EMC ECS (Elastic Cloud Storage) Architectural Guide v2.x;" EMC; Jun. 2015; available at: https://www.dell.com/community/s/vjauj58549/attachments/vjauj58549/solutions-ch/477 /1/h14071-ecs-architectural-guide-wp.pdf (Year: 2015).

Mohan et al., "Geo-aware erasure coding for high-performance erasure-coded storage clusters", Springer Link, URL: https://link.springer.com/article/10.1007/s 12243-017-0623-2, Jan. 18, 2018.

Final Office Action received for U.S. Appl. No. 16/179,486 dated Jan. 28, 2021, 55 pages.

Non-Final Office Action received for U.S. Appl. No. 16/670,746 dated Feb. 16, 2021, 55 pages.

Dell Technologies, "ECS Overview and Architecture", h14071.18, Feb. 2021, 21 Pages.

EMC; "EMC ECS (Elastic Cloud Storage) Architectural Guide v2.x", URL : https://www.dell.com/community/s/vjauj58549/attachments/vjauj58549/solutions-ch/477 /1/h14071-ecs-architectural-guide-wp.pdf,Jun. 2015, 21 pages.

Non-Final Office Action received for U.S. Appl. No. 16/177,285 dated Apr. 9, 2021, 41 pages.

Non-Final Office Action received for U.S. Appl. No. 16/779,208 dated Apr. 20, 2021, 71 pages.

Notice of Allowance received for U.S. Appl. No. 16/570,657 dated Sep. 7, 2021, 65 pages.

Ma et al., "An Ensemble of Replication and Erasure Codes for Cloud File Systems", Proceedings—IEEE INFOCOM, Apr. 2013, pp. 1276-1284.

Final Office Action received for U.S. Appl. No. 16/698,096 dated Sep. 7, 2021, 24 pages.

Final Office Action received for U.S. Appl. No. 16/177,285 dated Sep. 14, 2021, 65 pages.

Final Office Action received for U.S. Appl. No. 16/670,715 dated Sep. 7, 2021, 35 pages.

Final Office Action received for U.S. Appl. No. 16/179,486 dated Oct. 20, 2021, 46 pages.

Notice of Allowance dated Sep. 10, 2021 for U.S. Appl. No. 16/745,855, 30 pages.

Office Action dated Nov. 24, 2021 for U.S. Appl. No. 16/526,182, 83 pages.

Non-Final Office Action received for U.S. Appl. No. 16/698,096 dated Jan. 5, 2022, 21 pages.

Non-Final Office Action received for U.S. Appl. No. 16/670,715 dated Jan. 5, 2022, 22 pages.

Non-Final Office Action received for U.S. Appl. No. 16/834,649 dated Jan. 28, 2022, 26 pages.

Office Action dated Feb. 8, 2022 for U.S. Appl. No. 16/986,222, 62 pages.

\* cited by examiner

VERIFIABLE INTRA-CLUSTER MIGRATION FOR A CHUNK STORAGE SYSTEM

TECHNICAL FIELD

The disclosed subject matter relates to data storage, more particularly, to migration of data for a chunk storage system.

BACKGROUND

Conventional data storage techniques can store data in one or more arrays of data storage devices. As an example, data can be stored in ECS (formerly known as ELASTIC CLOUD STORAGE), hereinafter ECS system, such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes can be considered part of a group, cluster, etc. As such, a node with many disks can, in some conventional embodiments, comprise a large amount of storage. As an example, a storage group of five nodes, with ten disks per node, at 8 terabytes (TBs) per disk is roughly 400 TB in size. Generally, ECS does not use traditional databases to store metadata and system data, rather, all data, including customer data, replicate data, directory tables, chunk tables, metadata, etc., can typically be stored in chunks in a chunk storage space in an intermingled manner. As an example, a storage service can maintain one or more directory table (DT), where a DT, for example, can be a union of 128 search trees, partitions, etc., wherein a chunk manager (CM) can maintain a chunk table (CT) that can contain information about all the chunks in a portion of the chunk storage space of the system. Elements of a search tree, e.g., roots, nodes, leaves, etc., can be stored in one or more chunks of the example portion of the chunk storage space of the system as well. As an example, tree elements stored in a tree chunk can be stored to nearly any part of the example portion of the chunk storage space of the system, for instance, next to a chunk with user data. In some circumstances, data, including customer data, directory tables, chunk tables, metadata, etc., can be migrated between portions of an ECS system. However, conventional migration technology can fail to provide for an ability to verify that the migration of data has been performed properly, e.g., where a chunk table is moved, this can result in updates to the chunk table itself during the move that can lead to an inability to verify movement of other chunks, garbage collection can result in a mismatch between a chunk that was to be moved and a chunk table, recovery operations can result in a mismatch between a recovered chunk and a chunk table, etc. It can be desirable to avoid these types of issues during an intra-cluster migration.

DETAILED DESCRIPTION

Figure 1:
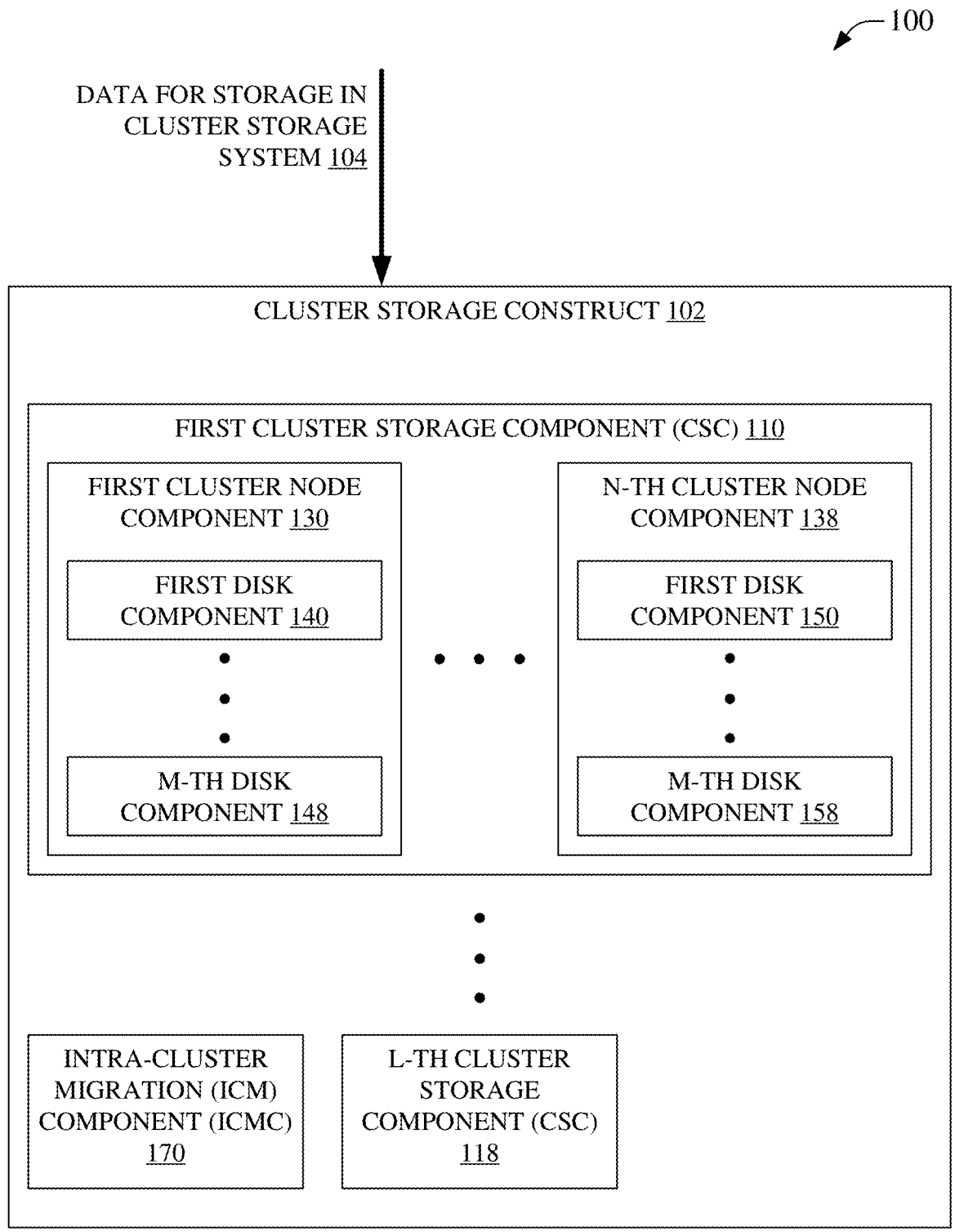
FIG. 1 is an illustration of an example system that can facilitate chunk storage in a chunk storage system that supports intra-cluster migration, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, data storage techniques can conventionally store data in one or more arrays of data storage devices. As an example, data can be stored in an ECS system such as is provided by DELL EMC. The example ECS system can comprise data storage devices, e.g., disks, etc., arranged in nodes, wherein nodes can be comprised in an ECS cluster. One use of data storage is in bulk data storage. Data can conventionally be stored in a group of nodes format for a given cluster, for example, in a conventional ECS system, all disks of nodes comprising the group of nodes are considered part of the group. In some circumstances, data, including customer data, directory tables, chunk tables, metadata, etc., can be migrated between portions of in an ECS system. As an example, a new nodes can be added to an ECS system, such as during a generational upgrade of ECS hardware, and it can be desirable to move a cluster, e.g., all the relevant chunks of the cluster, etc., from nodes of a previous generation to the newly added nodes, e.g., to the current generation of nodes of the ECS system.

Conventional migration technology can fail to provide for intra-cluster migration that can be verifiable, e.g., that the migration of data has been performed properly. As examples, where a chunk table is moved, this can result in updates to the chunk table itself during the move that can lead to an inability to verify movement of other chunks, garbage collection can result in a mismatch between a chunk that was to be moved and a chunk table, recovery operations can result in a mismatch between a recovered chunk and a chunk table, etc. In an aspect, locking the ECS during migration can be one technique to avoid these types of issues, but can accordingly impact access to data, storage of new data, etc., during the lockdown and therefore can generally not be a favored technique for intra-cluster migration. As is disclosed herein, there can be another technique that can allow for continued use of an ECS system during an intra-cluster migration that can also enable verification.

In an embodiment of the presently disclosed subject matter, a cluster can comprise a logical arrangement of real storage devices. In a cluster, a group of the real storage devices can be comprised in one or more hardware nodes. In an aspect, a cluster can support data redundancy, which, in an aspect, can allow for failure of a portion the cluster, e.g., one or more nodes becoming less accessible, etc., without loss of access to stored data, can allow for removal/addition of one or more nodes from/to the cluster without loss of access to stored data, etc. In an embodiment, software, firmware, etc., can hide an abstraction of the real storage devices so that they can appear to be a contiguous block of data storage even where, for example, it can be spread across multiple portions of one or more real disks, multiple real groups of hardware nodes, multiple real clusters of hardware nodes, multiple geographic locations, etc. Generally, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc., wherein 'mapped' is intended to convey a distinction, e.g., an abstraction, etc., from a corresponding real physical hardware component.

In an embodiment, a portion of a cluster, e.g., a mapped cluster, etc., can be comprised in a real cluster, e.g., a portion of a cluster can be N' by M' in size and the real cluster can be N by M in size, where N'=N and where M'=M. In other embodiments, N' can be less than, or equal to, N, and M' can be less than, or equal to, M. It will be noted that in some embodiments, M' can be larger than M, e.g., where the mapping of a M real disks into M' mapped disks portions can comprise use of a part of one of the M disks, for example, where 10 real disks (M=10) are mapped into 17 mapped disk portions (M'=17), 11 mapped disk portions (M'=11), 119 mapped disk portions (M'=119), etc. In these other embodiments, the portion of the cluster can be smaller than the real cluster. As an example, where the real cluster is 8×8, e.g., 8 nodes by 8 disks, then, for example, four mapped 4×4 clusters can be provided, wherein each of the four mapped 4×4 clusters is approximately ¼th the size of the real cluster. As a second example, given an 8×8 real cluster 16 mapped 2×2 clusters can be provided where each mapped cluster is approximately ¹⁄₁₆th the size of the real cluster. As a third example, for the 8×8 real cluster, 2 mapped 4×8 or 8×4 clusters can be provided and each can be approximately ½ the size of the real cluster. Additionally, the example 8×8 real cluster can provide a mix of different sized mapped clusters, for example one 8×4 mapped cluster, one 4×4 mapped cluster, and four 2×2 mapped clusters. In some embodiments, not all of the real cluster must be comprised in a mapped cluster, e.g., an example 8×8 real cluster can comprise only one 2×4 mapped cluster with the rest of the real cluster not (yet) being allocated into mapped storage space. In an aspect, a cluster can have nodes added to it such that the cluster can become larger and, in an aspect, data, e.g., chunks, etc., can be migrated from previous nodes into the newly added nodes, for example as part of a generational upgrading of chunk storage system hardware, etc.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate chunk storage in a chunk storage system that supports intra-cluster migration, in accordance with aspects of the subject disclosure. System 100 can comprise a cluster storage construct 102, which can be embodied in a cluster storage system. In an embodiment, cluster storage construct 102 can be embodied in a real cluster storage system comprising one or more hardware nodes that each comprise one or more storage devices, e.g., hard disks, optical storage, solid state storage, etc. Cluster storage construct 102 can receive data for storage in a cluster, e.g., data for storage in a cluster storage system 104, etc., hereinafter data 104 for brevity. Disk access events, e.g., accessing a disk for data storage, retrieval, or other operations, can be facilitated by an instance of a storage service that can execute on a processor of a real node. As such, disk operations, e.g., operations logically performed on an abstracted portion of a cluster/disk/etc., can correlate to real operations on real disks of a real cluster according to a mapping of storage devices of corresponding to the portion of the real cluster. In an aspect, data 104 can be stored, retrieved, etc., by, from, on, etc., portions of the one or more storage devices of cluster storage construct 102 according to a logical mapping of the storage space.

In an embodiment, a portion of a real disk can be comprised in a portion of a real node that can be comprised in a portion of a real cluster. Accordingly, in an embodiment, cluster storage construct 102 can support a storage of data 104 on one or more portions of a disk, e.g., first disk component 140 through M-th disk component 148 of first cluster node component 130 through first disk component 150 through M-th disk component 158 of N-th cluster node component 138 of first cluster storage component (CSC) 110, through disks corresponding to CSCs of L-th cluster storage component 118, according to a mapping schema. The mapping can be stored in one or more directory tables that themselves can be stored across one or more chunks in a portion of chunk storage space. In an aspect, a mapping of a portion of a cluster can indicate where in cluster storage construct 102 data 104 is to be stored, can cause data 104 to be retrieved from a location in in cluster storage construct 102 based on the mapping of the portion of the cluster, etc.

Intra-cluster migration (ICM) component (ICMC) 170 can facilitate verifiable migration of chunks between portions of cluster storage system 100. In an aspect, ICMC 170 can cause a first chunk table to be locked in response to generation of a second chunk table. Correspondingly, chunks of the first chunk table can be locked, e.g., they can become read only, etc., to prevent modification of mapped relationships between chunks residing in a first portion of the chunk storage space. This can support access to chunks existing up to the point of the second chunk table being created. New chunks can then be added to a second portion of the chunk space corresponding to the second chunk table, and accessed accordingly while 'old' chunks, e.g., those existing prior to the second chunk table can remain accessible but are not modifiable in the first chunk space. Accordingly, modification of the old chunks can occur only in the second chunk space. As an example, modification of an old chunk can comprise writing the modified old chunk into the second chunk space and updating the second chunk table. Moreover, old chunks can be moved from the first chunk space to the new chunk space and the second chunk table can be correspondingly updated. Subsequent to migration of live old chunks, e.g., chunks that are not deleted, stale, recovered, garbage, etc., from the first chunk space to the second chunk space and corresponding updating of the second chunk table, the first chunk table can be employed to verify that the second chunk table provides access to migrated chunks of the second chunk space that correspond to the old chunks of the first chunk space, e.g., allowing for verification of the intra-cluster migration of data from first chunk space to the second chunk space. In an aspect, some manual healing can be needed for live old chunks that fail verification. Subsequently, the first chunk space can be reclaimed, removed, etc., e.g., the first chunk table and first chunk space can be deleted, removed from the system, overwritten, etc. As an example, newer generation nodes can be added to an ECS and ICMC 170 can enable intra-cluster migration of data from older generation nodes to the newer generation nodes in a verifiable manner before the older generation nodes are removed from the ECS. In this example, the verifiable manner can comprise preservation of existing chunks, which can inherently preserve an existing chunk table where the chunk table can exist as tree chunks comprised among the existing chunks, until a new chunk table and migrated chunks can be verified against the existing chunk table and any manual healing can have been completed or otherwise resolved.

Figure 2:
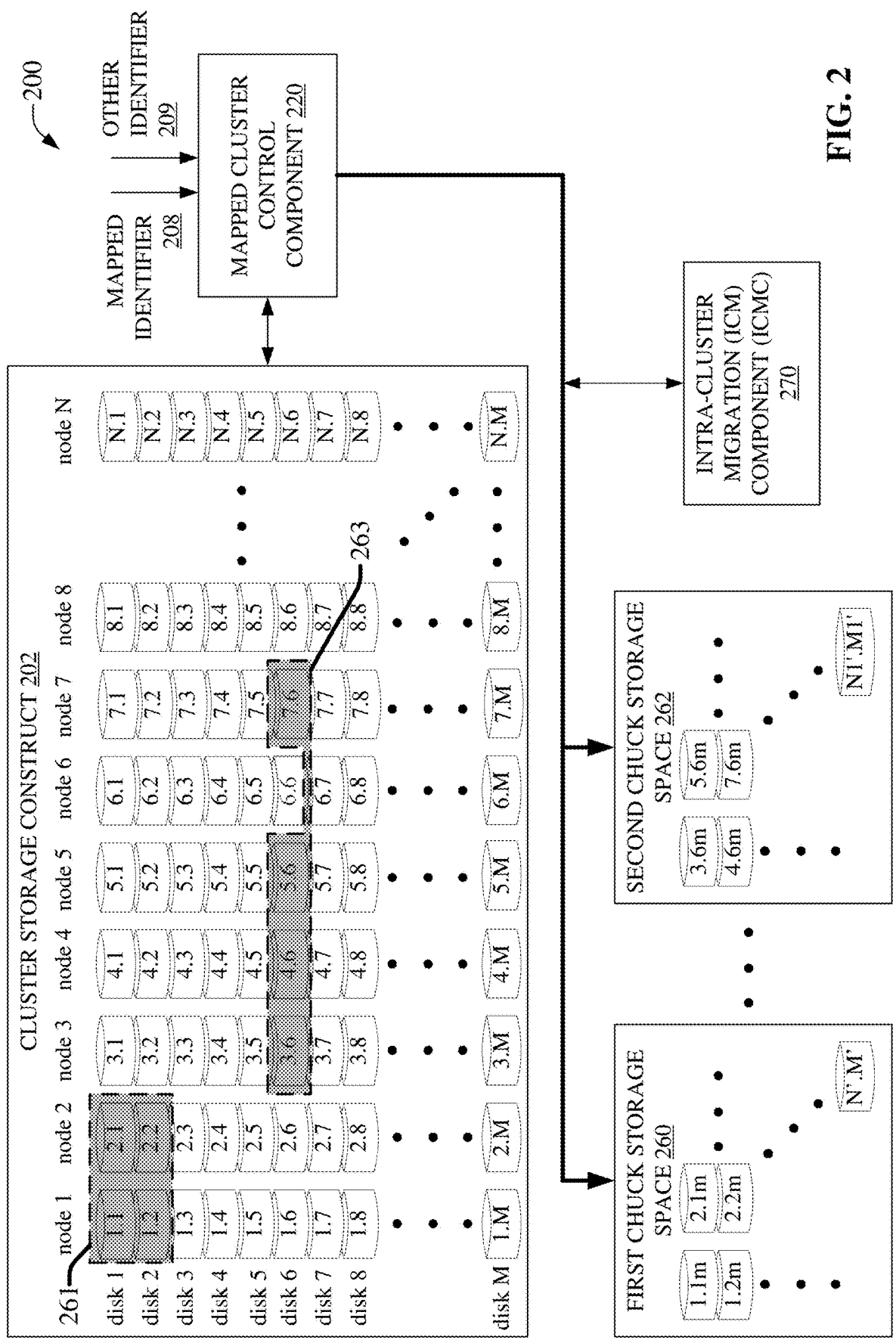
FIG. 2 illustrates an example system that can facilitate chunk storage across different nodes in a chunk storage system that supports intra-cluster migration, in accordance with aspects of the subject disclosure.

FIG. 2 is an illustration of a system 200, which can enable chunk storage across different nodes in a chunk storage system that supports intra-cluster migration, in accordance with aspects of the subject disclosure. System 200 can comprise cluster storage construct 202 that can comprise disk portions 1.1 to N.M, etc. Mapped cluster control component 220 can facilitate allocation of one or more portions of a cluster, e.g., first chunk storage space 260, second chunk storage space 262, etc.

Mapped cluster control component 220 can receive mapped identifier 208, other identifier 209, etc., which identifiers can enable directing data, e.g., data 104, etc., to disk portions of cluster storage construct 202 corresponding to a relevant chunk storage space, e.g., first chunk storage space 260, second chunk storage space 262, etc. Mapped identifier 208 can be comprised in received data, e.g., data 104, etc., for example, a customer can indicate mapped identifier 208 when sending data for storage in a mapped cluster. Mapped identifier 208 can also be included in a request to access data. In an embodiment, mapped identifier 208 can indicate a logical location in a cluster storage space that can be translated by mapped cluster control component 220 to enable access to the a real location of a disk portion in cluster storage construct 202. This can allow use of a logical location to access, e.g., read, write, delete, copy, etc., data from a physical data store. Other identifier 209 can similarly be received. Other identifier can indicate a real location rather than a mapped location, e.g., mapped cluster control component 220 can provide a real location based on the mapping of a mapped cluster, and such real location can then be used for future access to the real location corresponding to the mapped location.

In an embodiment, first chunk storage space 260 can comprise, for example, disk portion 1.1m, 1.2m, 2.1m, 2.2m, . . . , N'.M', second chunk storage space 262, can comprise, for example, disk portion 3.6m, 4.6m, 5.6m, 7.6m, . . . , N1'.M1', etc. The example disk portions can map back to corresponding disk portions of cluster storage construct 202, e.g., first chunk storage space 260 can map to disk portions 261 of cluster storage construct 202, second chunk storage space 262 can map to disk portions 263 of cluster storage construct 202, etc. System 200 illustrates that mapped clusters can comprise contiguous portions of cluster storage construct 202, e.g., disk portions of 261 are illustrated as contiguous. System 200 further illustrates non-contiguous allocation, e.g., disk portions of 263 are illustrated as contiguous for portions 3.6, 4.6, and 5.6, but non-contiguous with disk portion 7.6. It will be noted that other allocations can also be made without departing from the scope of the disclosed subject matter, e.g., another unillustrated mapped cluster can comprise disk portions from cluster storage construct 202 that are each from different nodes and different disk levels, etc., which allocations have not been explicitly recited for the sake of clarity and brevity.

ICMC 270 can enable verifiable intra-cluster migration of data in system 200. As an example, where data is stored in disk portions 261 corresponding to first chunk storage space 260, data can be migrated to second chunk storage space 262 corresponding to disk portions 263. In an embodiment of this example, at a first time, cluster storage construct 202 can comprise node 1 and node 2 and at a second time node 3 to node 7 can be added to cluster storage construct 202. In this embodiment, ICMC 270 can facilitate migration of chunks from node 1 and node 2, e.g., chunks of first chunk storage space 260, to nodes 3, 4, 5, and 7, e.g., as chunks of second chunk storage space 262, and after verification and/or healing, can allow for removal of nodes 1 and 2.

Figure 3:
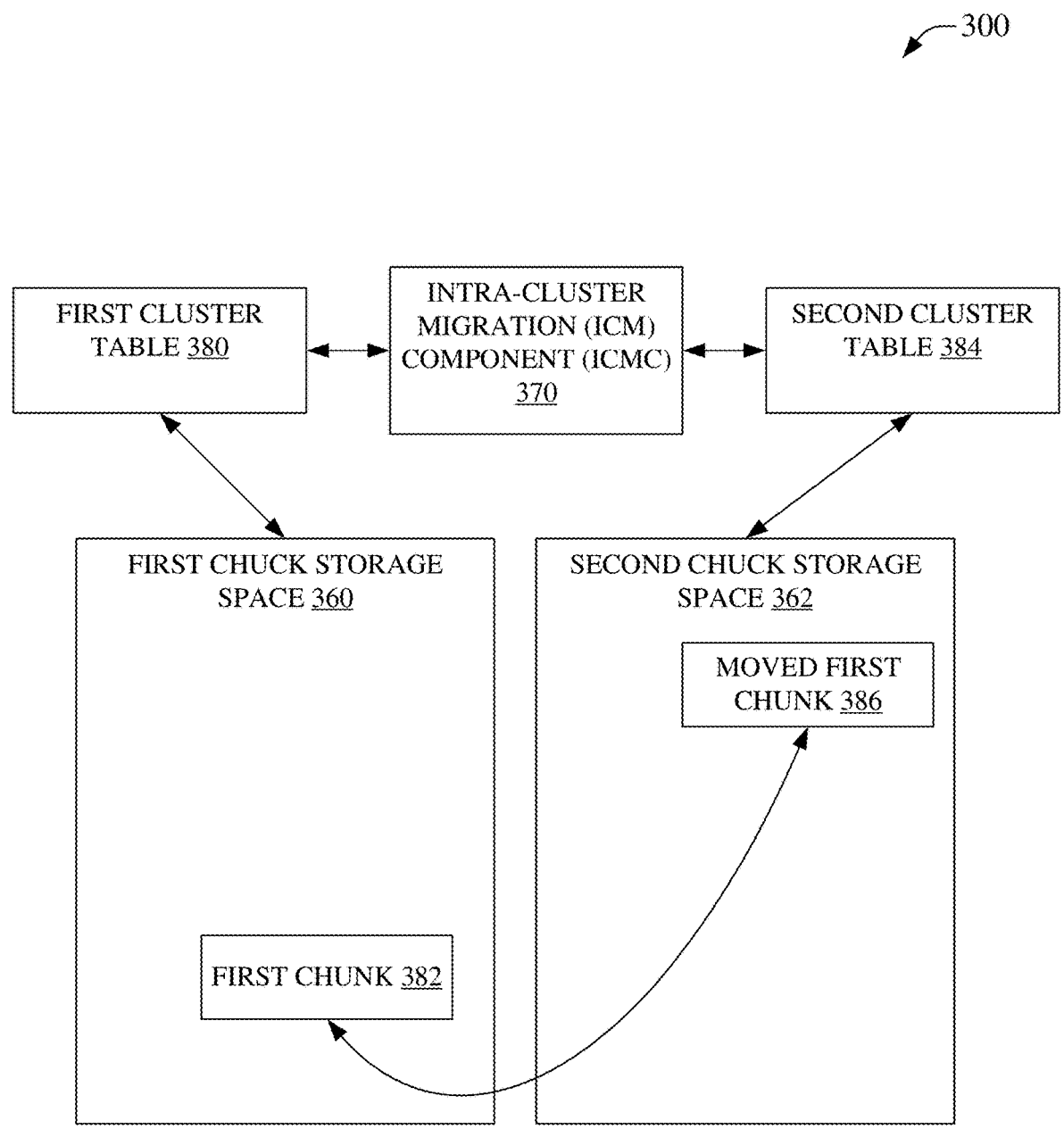
FIG. 3 is an illustration of an example system that can enable verifiable intra-cluster migration of a chunk stored in a chunk storage system, in accordance with aspects of the subject disclosure.

FIG. 3 is an illustration of a system 300, which can facilitate verifiable intra-cluster migration of a chunk stored in a chunk storage system, in accordance with aspects of the subject disclosure. System 300 can comprise first chunk storage space 360, which can, in some embodiments, be comprised of portions of disks of nodes of a cluster. First chunk 382 can be stored in first chunk storage space 360, e.g., at a location of a portion of a disk of a node of a cluster, wherein the location can be stored in first cluster table 380 to enable access to data of the chunk. First chunk 382 can be intra-cluster migrated to another chunk storage space, e.g., second chunk storage space 362, etc., as moved first chunk 384 that can be associated with a different location, e.g., a different portion of a disk of a node of the cluster, than the location of first chunk 382.

This intra-cluster migration can be facilitated by ICMC 370. In an aspect, second cluster table 384 can store location data of chunks of second storage space 362, e.g., migrating first chunk 382 from first chunk storage space 360 to second chunk storage space 362 as moved first chunk 384 can result in storing the location of moved first chunk 384 in second cluster table 384. It is noted that data of first cluster table 380 can be stored in chunks, e.g., tree chunks, in first storage space 360 and, as a corollary, data of second cluster table 384 can be stored in chunks, e.g., tree chunks, in second storage space 362.

ICMC 370 can facilitate verifiable intra-cluster migration, in an aspect, by selecting, generating, etc., second cluster table 384. As an example, where new nodes are added to a cluster and migration to the new nodes is indicated, second cluster table 384 can be generated by ICMC 370 to facilitate a verifiable intra-cluster migration. ICMC 370 can scan first cluster table 380 and first chunk storage space 460 to check it for consistency, to calculate an approximate number of chunks to move, report progress of actual data migration, etc. Moreover, ICMC 370 can direct that first chunk storage space 360 is to be locked, that first cluster table 380 is to be locked, etc., such that data is not written to, modified in, etc., first chunk storage space 360 and/or first cluster table 380, and that new chunks, modification of chunks, etc., occurs in second chunk storage space 362 with corresponding updates to a cluster table represented by second cluster table 384. This can preserve the continuity of data stored via chunks of first chunk storage space 360 that are correspondingly addressed by values stored in tree chunks comprising first cluster table 380. Moreover, chunks of locked chunks storage space can typically be accessed for read-type operations that do not modify/create changes to the locked chunk storage space or corresponding locked cluster table. As such, the locked portions of the chunk storage system generally preserve the relationships and data prior to intra-cluster migration and can therefore be employed to verify relationships and data that has been migrated, e.g., to second chunk storage space 362 and second cluster table 384.

In an aspect, after locking existing data and relationships via locking first chunk storage space 360 and first cluster table 380, data can be migrated to second chunk storage space 320 and second cluster table 384. In an embodiment, this can be performed while prohibiting any data modification, manipulation, addition, etc., e.g., the cluster storage system can be locked during the intra-cluster migration. However, this can be difficult for an active system, e.g., migration can be much slower than modification, manipulation, addition, etc., of chunks and can therefor generally be undesirable despite being possible. As an example, it can be understood that locking up a storage system for hours or days to complete an intra-cluster migration is disfavored even though it is possible.

As such, in other embodiments, modification, manipulation, and addition of chunks can be allowed to continue in non-locked portions of a cluster storage system, e.g., these operations can be forbidden in first chunk storage space 360 and first cluster table 360 but can be allowed in second chunk storage space 362 and second cluster table 384. As an example, incoming customer data can be written to a chunk in second storage space 362 when first chunk storage space 360 is locked. This example data write can be accompanied by updating second cluster table 384 without changing a locked first cluster table 380.

Considering, in an example embodiment, where all chunks from first chunk storage space 360 have been migrated to second chunk storage space 362, chunk relationships stored in locked first cluster table 380 can then be employed to verify new chunk relationships stored in second cluster table 384. As an example, where first cluster table 380 indicates that first chunk 382 is stored at an address of first chunk storage space 360, verification can comprise determining that second cluster table 384 comprises an indication that moved first chunk 384 is stored in second chunk storage space 362. While the address of moved first chunk 384 can be different from an address of first chunk 382, the relationship is verifiable, e.g., second chunk storage space 362 can verifiably comprise moved first chunk 384 and can have an address in second cluster table 384. Where verification of all the relationships of first cluster table 380 has been satisfied, e.g., moved chunks exist and are addressed in another portion of a the chunk storage system, the chunk does not exist because it is deleted, the chunk does not exist because an alternate chunk is active in response to a recovery operation, etc., the first chunk space can be removed, reused, etc. That is, the chunk storage system must generally make sure that nothing has been left behind, and that data and metadata has not been lost. We note that typically in a chunk storage system, a chunk table, a main source of information about chunks of a chunk storage space, also stores its own data in the chunk space, that is, the chunk table itself is not only to be moved at the chunk level but it also gets completely rewritten during an intra-cluster migration because each chunk in the system can be moved from first chunk storage space 360 to second chunk storage space 362. Therefore, first cluster table 480 generally cannot be employed to assess the completeness of an intra-cluster migration if first cluster table 480 is also being modified in the intra-cluster migration. As such, employing second chunk storage space 362, which can comprise second cluster table 384, and locking first chunk storage space 360, which can result in locking first cluster table 380 that resides therein, can allow recordation of modified addressing while preserving information about chunk relationships for verification of completeness of an intra-cluster migration.

Figure 4:
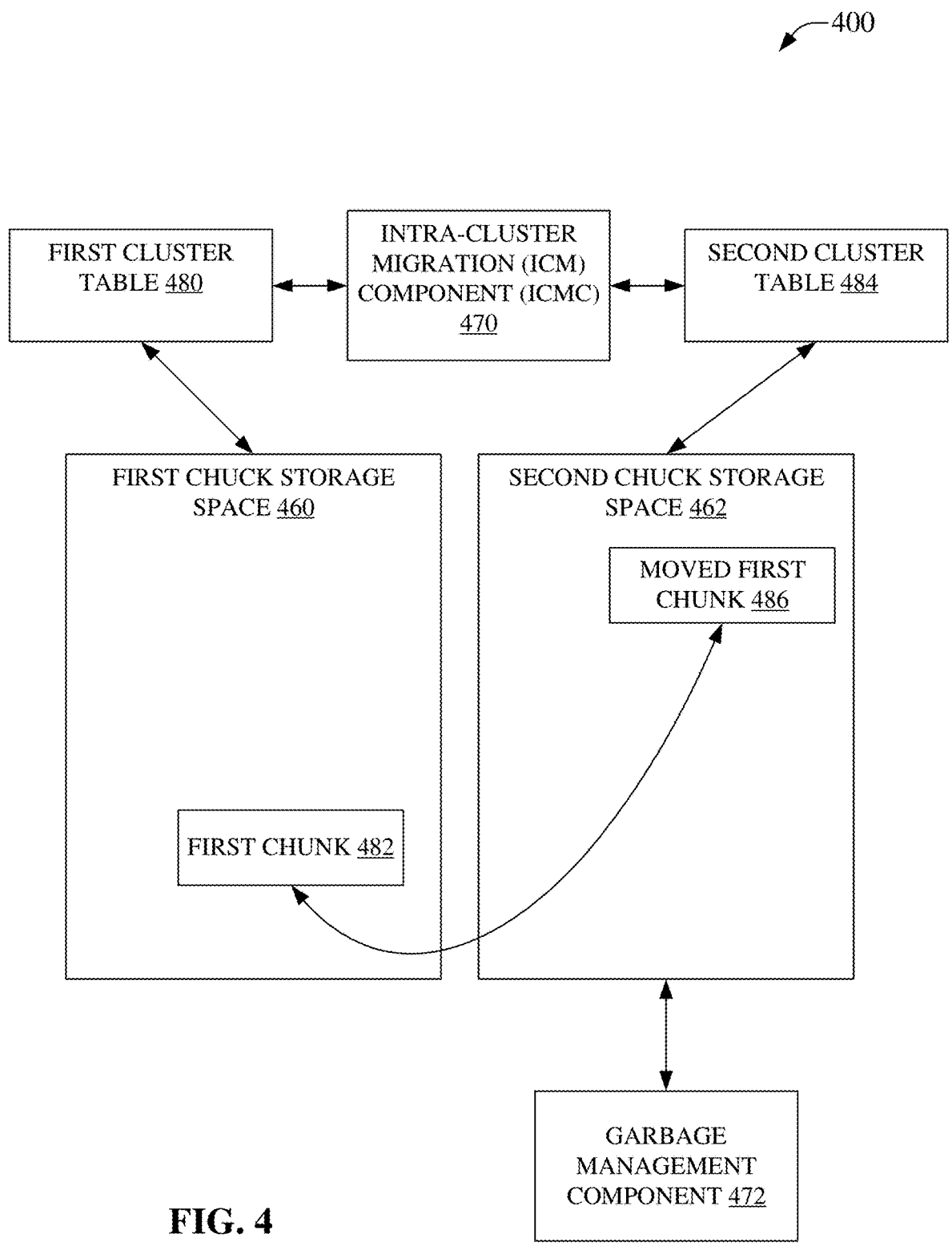
FIG. 4 illustrates an example system that can facilitate verifiable intra-cluster migration of a chunk stored in a chunk storage system with concurrent use of garbage collection technology, in accordance with aspects of the subject disclosure.

FIG. 4 is an illustration of a system 400, which can enable verifiable intra-cluster migration of a chunk stored in a chunk storage system with concurrent use of garbage collection technology, in accordance with aspects of the subject disclosure. System 400 can comprise first chunk storage space 460, which can store first chunk 482 at a location of a portion of a disk of a node of a cluster, wherein the location can be stored in first cluster table 480 to enable access to data of the chunk. First chunk 482 can be intra-cluster migrated to second chunk storage space 462, as moved first chunk 484, which can be associated with a different location that can be stored via second cluster table 484.

In system 400, intra-cluster migration can again be facilitated by ICMC 470. Second cluster table 484 can store location data of chunks of second storage space 462, e.g., migrating first chunk 482 from first chunk storage space 460 to second chunk storage space 462 as moved first chunk 484. ICMC 470 can direct that first chunk storage space 460 is to be locked, that first cluster table 480 is to be locked, etc., such that data is not written to, modified in, etc., first chunk storage space 460 and/or first cluster table 480, and that new chunks, modification of chunks, etc., occurs in second chunk storage space 462 with corresponding updates to a cluster table represented by second cluster table 484. This can preserve the continuity of data stored via chunks of first chunk storage space 460 that are correspondingly addressed by values stored in tree chunks comprising first cluster table 480. The locked portions of the chunk storage system generally preserve the relationships and data prior to intra-cluster migration and can therefore be employed to verify chunks migrated to second chunk storage space 462 and as mapped by second cluster table 484.

In embodiments, modification, manipulation, and addition of chunks can be allowed to continue in non-locked portions of a cluster storage system such that these operations can be forbidden in first chunk storage space 460 and first cluster table 460 but can be allowed in second chunk storage space 462 and second cluster table 484. As such, garbage management component 472 can perform operations such as garbage collection via first chunk storage space 460 before an intra-cluster migration is initiated and via second chunk storage space 462 after the intra-cluster migration is initiated, e.g., upon locking of first chunk storage space 460, garbage management can be performed via non-locked second chunk storage space 462. In an example, after initiation of intra-cluster migration, first chunk 482 can be migrated as moved first chunk 484. In this example, where first chunk 482 is then determined, for example by garbage management component 472, as 'to be deleted', the deletion can be prohibited on first chunk 482 because it is in locked chunk storage space 460. However deletion of moved first chunk 484 can be accomplished in non-locked second storage space 462 and second cluster table 484 can be updated to reflect the deletion of moved first chunk 484. Accordingly, in verification of the intra-cluster migration, second cluster table can be checked for the existence of moved first chunk 484. In this example, moved first chunk 484 will not exist, but an indication that it was deleted via garbage management component 472 can verify the absence of moved first chunk 484 in second chunk storage space 462. In an aspect, where first chunk 482 had not been migrated as moved first chunk 484 before it was to be deleted according to garbage management component 472, the migration of first chunk 482 can be avoided, e.g., second cluster table 484 can indicate that first chunk 482 was marked for deletion prior to migration, because there is no need to migrate garbage chunks. In this aspect, the verification can be predicated on the indication in second cluster table 484 showing 'deleted prior to moving' as valid for the relationship of first chunk 482 present in first cluster table 480. As an aside, in some embodiments, first chunk 482 can be deleted, e.g., the space recovered, from locked first chunk storage space 460, despite this generally going against the concept of locking first chunk storage space 460, as an example, where first chunk storage space is not to be removed, but rather repurposed, prompt recovery of space previously allocated by deleted chunks can be important enough to allow recovery from a 'locked' chunk storage space. This does not upset verification of these embodiments because second cluster table 484 can satisfy verification of deleted chunks with or without the deleted chunk existing in the locked chunk storage space. However, in more usual embodiments, the deleted chunk can remain in the locked chunk storage space until verification has been completed.

In other aspects, garbage management component 472 can update second cluster table 484 for other operations, e.g., recovery of data, etc. As an example, where a node comprising first chunk 482 becomes less accessible prior to migrating first chunk 482 to second chunk storage space 462, causing recovery of the data of first chunk 482, this recovered chunk can populate garbage second chunk storage space 462. In an aspect, a redundant chunk for first chunk 482 can be used to generate moved first chunk 484 such that the data of less accessible first chunk 482 is accessible as moved first chunk 4484 even though it is based on recovered chunk data, a replicate of chunk data, etc. As with deleted chunks, recovered chunks can be indicated in second cluster table 484 in a manner than can be determined to satisfy verification of intra-cluster migration based on locked first cluster table 480.

In an aspect, where a recovered chunk is to be deleted prior to completing of verified intra-cluster migration, the chunk set, e.g., chunk and replicates, etc., probably has parts stored to both old and new nodes. As such, the chunk can require special treatment. The chunk can be marked as deleted and if the chunk is not a tree chunk, its parts stored within the new nodes can be deleted and the capacity they occupy can be reclaimed as is noted hereinabove. In this type of situation, the recovered indication can be cleared as deleted chunks are not of further concern. However, if the chunk is a tree chunk, it can comprise elements of first cluster table 480 and it can be unsafe to physically delete as it could risk loss of address continuity to other chunks. In this type of situation, the tree chunk can be marked as both recovered and deleted, which can trigger additional handling during verification after migration. In an embodiment, a deleted tree chunk can employ recovery after a hardware failure.

Figure 5:
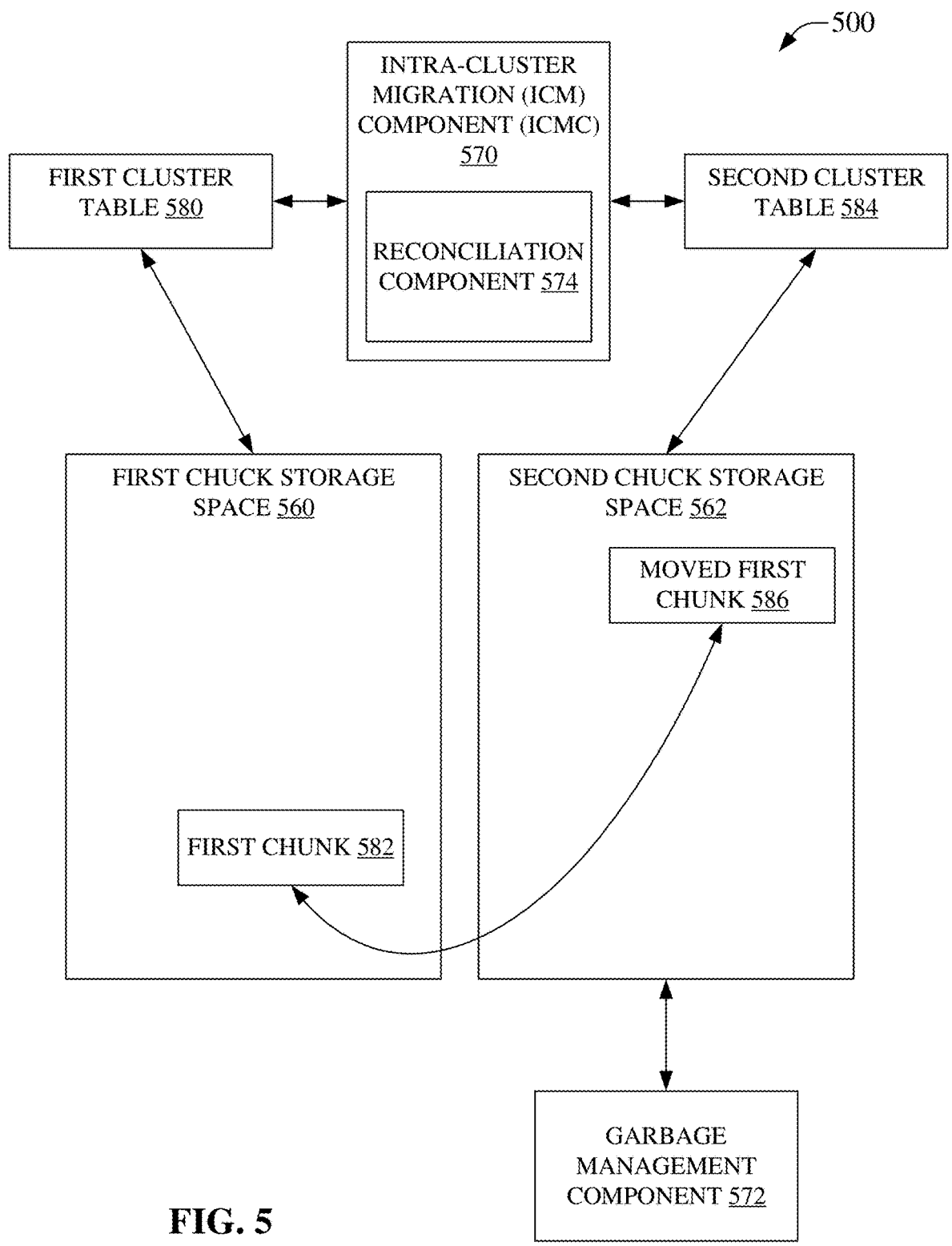
FIG. 5 is an illustration of an example system that can facilitate reconciliation of verifiable intra-cluster migration of a chunk stored in a chunk storage system, in accordance with aspects of the subject disclosure.

FIG. 5 is an illustration of a system 500, which can enable reconciliation of verifiable intra-cluster migration of a chunk stored in a chunk storage system, in accordance with aspects of the subject disclosure. System 500 can comprise first chunk storage space 560, which can store first chunk 582 at a location of a portion of a disk of a node of a cluster, wherein the location can be stored in first cluster table 580 to enable access to data of the chunk. First chunk 582 can be intra-cluster migrated to second chunk storage space 562, as moved first chunk 584, which can be associated with a different location that can be stored via second cluster table 584.

In system 500, intra-cluster migration can again be facilitated by ICMC 570. Second cluster table 584 can store location data of chunks of second storage space 562, e.g., migrating first chunk 582 from first chunk storage space 560 to second chunk storage space 562 as moved first chunk 584. ICMC 570 can direct that first chunk storage space 560 is to be locked, that first cluster table 580 is to be locked, etc., such that data is not written to, modified in, etc., first chunk storage space 560 and/or first cluster table 580, and that new chunks, modification of chunks, etc., occurs in second chunk storage space 562 with corresponding updates to a cluster table represented by second cluster table 584. This can preserve the continuity of data stored via chunks of first chunk storage space 560 that are correspondingly addressed by values stored in tree chunks comprising first cluster table 580. The locked portions of the chunk storage system generally preserve the relationships and data prior to intra-cluster migration and can therefore be employed to verify chunks migrated to second chunk storage space 562 and as mapped by second cluster table 584.

In embodiments, modification, manipulation, and addition of chunks can be allowed to continue in non-locked portions of a cluster storage system such that these operations can be forbidden in first chunk storage space 560 and first cluster table 560 but can be allowed in second chunk storage space 562 and second cluster table 584. As such, garbage management component 572 can perform operations such as garbage collection via first chunk storage space 560 before an intra-cluster migration is initiated and via second chunk storage space 562 after the intra-cluster migration is initiated, e.g., upon locking of first chunk storage space 560, garbage management can be performed via non-locked second chunk storage space 562. Additionally, garbage management component 572 can perform other operations, for example, updating second cluster table 584 in response to other operations, such as, recovery of data performed during an intra-cluster migration, etc. Garbage management component 572 can mark chunks in second cluster table 584 as, for example, moved and deleted, deleted prior to moving, recovered, deleted after recovery, etc. These indications can facilitate verification of an intra-cluster migration.

Reconciliation component 574 can be employed to verify completion of an intra-cluster migration, e.g., that all live chunks have been moved and that outliers have been marked for manual healing. Reconciliation can be performed upon an indication of completion of chunk migration, e.g., after the migration phase has finished, the reconciliation phase can be started. Reconciliation component 574 can scan first cluster table 580 to verify that each chunk is marked. As is noted hereinabove, chunks can be marked as moved, deleted, recovered, deleted prior to move, recovered and deleted, etc. Reconciliation component 574 can further additionally check location information of moved chunks to make sure all parts of moved chunks belong to second chunk storage space 562. If there is a chunk, which is marked as other than moved or deleted, the reconciliation component 574 can add the chunk information a reconciliation report, e.g., a list of problematic chunks. As an example, an unrecoverable chunk during the intra-cluster migration cannot be moved and it is also not 'deleted' and so needs to be reported, e.g., to allow root cause analysis and manual healing of problematic chunks, which can also include 'recovered and deleted tree chunks,' among other types of chunks, as is noted hereinabove.

While a physical location of chunks comprising first cluster table 580, and chunks of first chunk storage space 560, can typically change during migration, the relationships between chunks is preserved by second cluster table 584, e.g., because cluster storage systems, such as ECS, can employ chunk-based addressing, preservation of a chunk ID can assures that the data can be located for access according to second cluster table 584, so long as the relationships are in accord with locked first chunk storage space 560. It is again noted that during reconciliation scanning of first cluster table 580, non-locked chunk location information is taken from second cluster table 582 and compared to the chunk relationships embodied in first cluster table 580, e.g., the address of first chunk 582 is valid under first cluster table 580 only until deletion/recovery of the locked portion of the cluster after reconciliation and, as such, second cluster table 582 should be determined to properly address migrated chunks residing in second chunk storage space 562 according to the relationships expressed in first cluster table 580 for chunks of first chunk storage space 560, and any changes/ modifications/etc., occurring during the migration phase of the intra-cluster migration.

Figure 6:
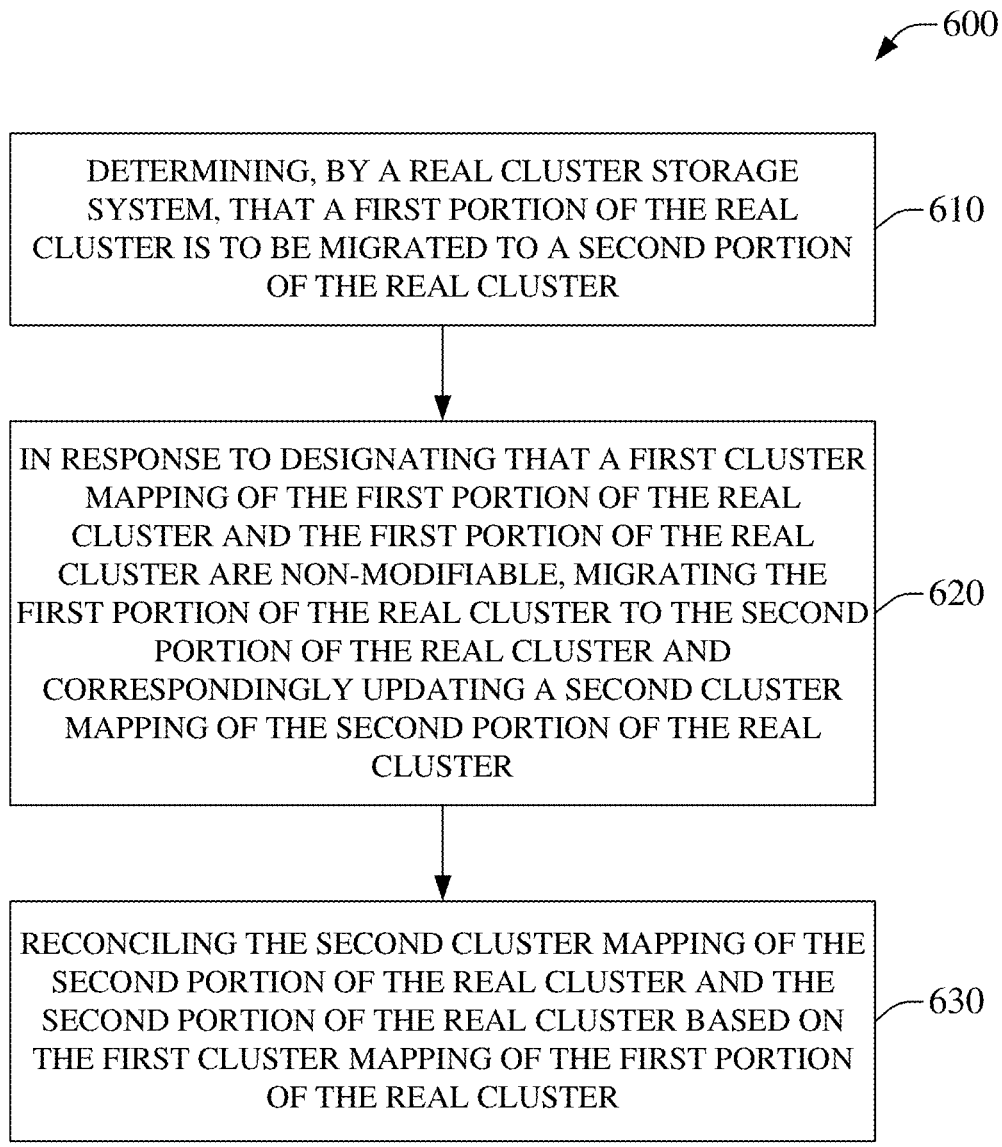
FIG. 6 illustrates an example system that can facilitate chunk storage in a chunk storage system that supports intra-cluster migration, in accordance with aspects of the subject disclosure.
Figure 7:
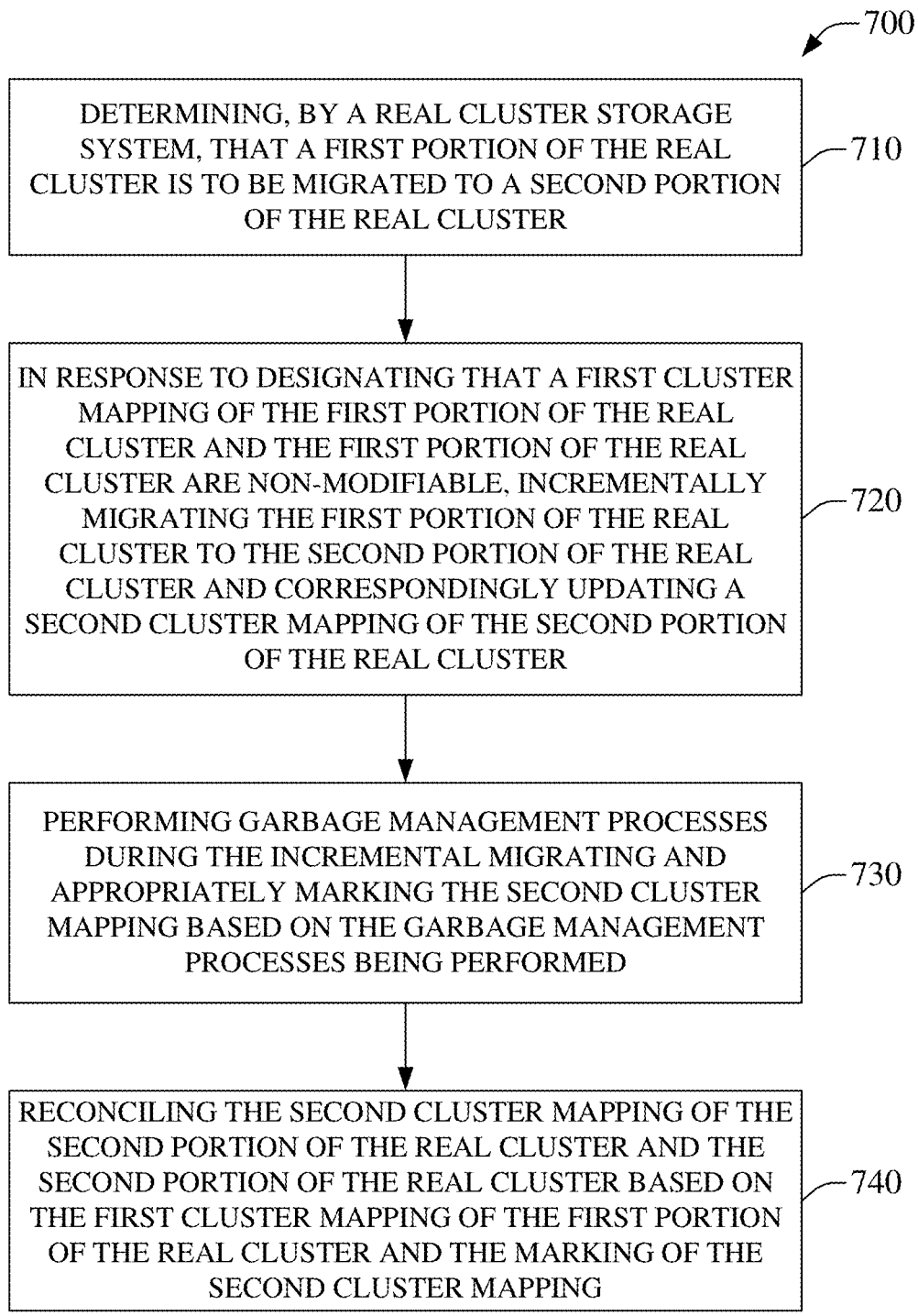
FIG. 7 is an illustration of an example method facilitating reconciliation of verifiable intra-cluster migration of a chunk stored in a chunk storage system employing garbage management, in accordance with aspects of the subject disclosure.
Figure 8:
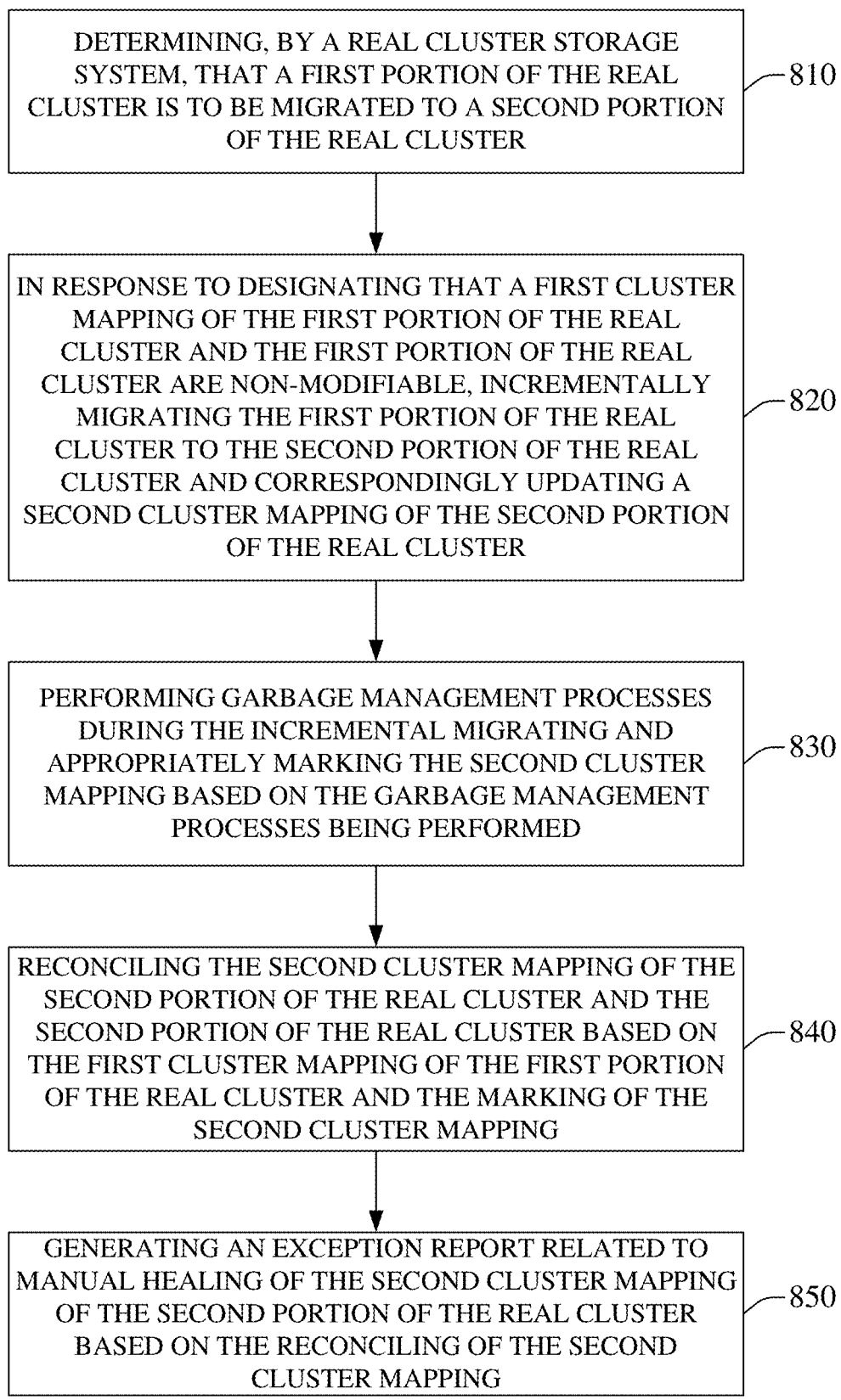
FIG. 8 illustrates an example method enabling generation of an exception report based on reconciliation of verifiable intra-cluster migration in a chunk storage system, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate chunk storage in a chunk storage system that supports intra-cluster migration, in accordance with aspects of the subject disclosure. At 610, method 600 can comprise determining that a first portion of a real cluster is to be migrated to a second portion of the real cluster. The determining can be via a processor of the real cluster storage system. In an embodiment, cluster storage system can be embodied in a real cluster storage system comprising one or more hardware nodes that each comprise one or more storage devices, e.g., hard disks, optical storage, solid state storage, etc. In an embodiment, a portion of a real disk can be comprised in a portion of a real node that can be comprised in a portion of a real cluster. The cluster storage system can receive data for storage in the cluster storage system. Disk access events, e.g., accessing a disk for data storage, retrieval, or other operations, can be facilitated by an instance of a storage service that can execute on a processor of a real node. As such, disk operations, e.g., operations logically performed on an abstracted portion of a cluster/disk/etc., can correlate to real operations on real disks of a real cluster according to a mapping of storage devices of corresponding to the portion of the real cluster. In an aspect, data can be stored, retrieved, etc., by, from, on, etc., portions of the one or more storage devices of cluster storage system according to a logical mapping of the storage space.

In an aspect, the cluster storage system can comprise a first cluster mapping of a first portion of the real cluster storing chunks. The chunks can comprise various types of chunks, e.g., data chunks, tree chunks, metadata chunks, etc. Intra-cluster migration of the chunks of the can be desirable, for example, in response to hardware changes to the cluster storage system such as generational updating of real nodes, etc. It can be determined that an intra-cluster migration is to occur. Intra-cluster migration can cause migration of chunks of the first portion of the real cluster to a second portion of the real cluster. As an example, where a next generation node is added to the real cluster storage system, migration of chunks stored on the previously existing node(s) can be migrated to the next generation node, e.g., to improve performance of the cluster storage system.

Method 600, at 620, can comprise migrating the first portion of the real cluster to the second portion of the real cluster. This can be in response to designating that the first portion of the real cluster and a corresponding first cluster mapping have been designated as non-modifiable, e.g., locked. The locked first portion of the real cluster and first cluster mapping can therefore be read, but generally are not modifiable. As such, further non-read operations in the cluster storage system can be performed in a second portion of the real cluster and be reflected in a corresponding second cluster mapping. As an example, after locking of the first portion of the real cluster, a new chunk to be written can be written to the second portion of the real cluster and the second mapping can be updated to reflect the location of the new chunk in the second portion of the real cluster. As another example, a chunk from the first portion of the real cluster can be written to the second portion of the real cluster and the second mapping can be updated accordingly. In an aspect, this does not alter the first mapping or the first portion of the real cluster, but does enable continued use of the real cluster storage system during intra-cluster migration.

At 630, method 600 can comprise reconciling the second cluster mapping and the second portion of the real cluster. At this point method 600 can end. The reconciling can be based on the first cluster mapping. Where the first cluster mapping is non-modifiable, the first cluster mapping can preserve relationships of chunks of the first portion of the real cluster. These relationships can be verified in the second mapping of the second portion of the real cluster, e.g., where the relationships of the chunks of the first portion of the real cluster exist in the second portion of the real cluster, as indicated by the second mapping, access to the data in the migrated chunks of the second portion of the real cluster can be the same or similar to the chunks of the first portion of the real cluster.

FIG. 7 is an illustration of an example method 700, which can facilitate reconciliation of verifiable intra-cluster migration of a chunk stored in a chunk storage system employing garbage management, in accordance with aspects of the subject disclosure. At 710, method 700 can comprise determining that a first portion of a real cluster is to be migrated to a second portion of the real cluster. The determining can be via a processor of the real cluster storage system. In an aspect, the cluster storage system can comprise a first cluster mapping of a first portion of the real cluster storing chunks. Intra-cluster migration of the chunks of the can be desirable. It can be determined that an intra-cluster migration is to occur. Intra-cluster migration can cause migration of chunks of the first portion of the real cluster to a second portion of the real cluster.

Method 700, at 720, can comprise incrementally migrating the first portion of the real cluster to the second portion of the real cluster. This can be in response to designating that the first portion of the real cluster and a corresponding first cluster mapping have been designated as non-modifiable, e.g., locked. The locked first portion of the real cluster and first cluster mapping can therefore be read, but generally are not modifiable. As such, further non-read operations in the cluster storage system can be performed in a second portion of the real cluster and be reflected in a corresponding second cluster mapping. Incremental migration can indicate that portions/chunks of the first portion can be migrated in successive migration operations until all of the chunks of the first portion have been migrated. In an aspect, other operations can be performed, as is disclosed elsewhere herein, during the incremental migration. As an example, a processor can move a chunk, then the processor can perform garbage collection, then a new chunk can be written, then another chunk migration can occur, then a chunk read can occur, etc., until the migration of the first portion is complete.

At 730, method 700 can comprise performing garbage management processes during the incremental migrating. The garbage management processes can comprise appropriately marking the second cluster mapping based on the garbage management processes being performed. As an example, deletion of a chunk from the first portion before the chunk is migrated can result in marking the chunk as deleted in the second cluster mapping. In an aspect, in this example, migrating the chunk can avoided because migrating garbage chunks can be a waste of computing resources. As another example, deletion of a chunk after the chunk has been migrated can comprise deleting the chunk from the second portion of the real cluster and marking the chunk deleted in the second mapping. It is noted that while possible, deletion of the chunks of the above two example from the first portion of the real cluster is typically not performed, e.g., deletion can be deferred until the migration is completed and verified, at which point the first portion of the real cluster can be deleted/release in whole, or in part, such as by removing the corresponding nodes without using computing resources to delete/release individual chunks thereof.

At 740, method 700 can comprise reconciling the second cluster mapping and the second portion of the real cluster. At this point method 700 can end. The reconciling can be based on the first cluster mapping and the marking of the second cluster mapping. Where the first cluster mapping is non-modifiable, the first cluster mapping can preserve relationships of chunks of the first portion of the real cluster. These relationships can be verified in the second mapping of the second portion of the real cluster, e.g., where the relationships of the chunks of the first portion of the real cluster exist in the second portion of the real cluster, as indicated by the second mapping, access to the data in the migrated chunks of the second portion of the real cluster can be the same or similar to the chunks of the first portion of the real cluster.

FIG. 8 is an illustration of an example method 800, which can enable generation of an exception report based on reconciliation of verifiable intra-cluster migration in a chunk storage system, in accordance with aspects of the subject disclosure. At 810, method 800 can comprise determining that a first portion of a real cluster is to be migrated to a second portion of the real cluster. The determining can be via a processor of the real cluster storage system. In an aspect, the cluster storage system can comprise a first cluster mapping of a first portion of the real cluster storing chunks. Intra-cluster migration of the chunks of the can be desirable. It can be determined that an intra-cluster migration is to occur. Intra-cluster migration can cause migration of chunks of the first portion of the real cluster to a second portion of the real cluster.

Method 800, at 820, can comprise incrementally migrating the first portion of the real cluster to the second portion of the real cluster. This can be in response to designating that the first portion of the real cluster and a corresponding first cluster mapping have been designated as non-modifiable, e.g., locked. The locked first portion of the real cluster and first cluster mapping can therefore be read, but generally are not modifiable. As such, further non-read operations in the cluster storage system can be performed in a second portion of the real cluster and be reflected in a corresponding second cluster mapping. Incremental migration can indicate that portions/chunks of the first portion can be migrated in successive migration operations until all of the chunks of the first portion have been migrated. In an aspect, other operations can be performed, as is disclosed elsewhere herein, during the incremental migration. As an example, a processor can move a chunk, then the processor can perform garbage collection, then a new chunk can be written, then another chunk migration can occur, then a chunk read can occur, etc., until the migration of the first portion is complete.

At 830, method 800 can comprise performing garbage management processes during the incremental migrating. The garbage management processes can comprise appropriately marking the second cluster mapping based on the garbage management processes being performed. As an example, deletion of a chunk from the first portion before the chunk is migrated can result in marking the chunk as deleted in the second cluster mapping. In an aspect, in this example, migrating the chunk can avoided because migrating garbage chunks can be a waste of computing resources. As another example, deletion of a chunk after the chunk has been migrated can comprise deleting the chunk from the second portion of the real cluster and marking the chunk deleted in the second mapping. It is noted that while possible, deletion of the chunks of the above two example from the first portion of the real cluster is typically not performed, e.g., deletion can be deferred until the migration is completed and verified, at which point the first portion of the real cluster can be deleted/release in whole, or in part, such as by removing the corresponding nodes without using computing resources to delete/release individual chunks thereof.

At 840, method 800 can comprise reconciling the second cluster mapping and the second portion of the real cluster. The reconciling can be based on the first cluster mapping and the marking of the second cluster mapping. Where the first cluster mapping is non-modifiable, the first cluster mapping can preserve relationships of chunks of the first portion of the real cluster. These relationships can be verified in the second mapping of the second portion of the real cluster, e.g., where the relationships of the chunks of the first portion of the real cluster exist in the second portion of the real cluster, as indicated by the second mapping, access to the data in the migrated chunks of the second portion of the real cluster can be the same or similar to the chunks of the first portion of the real cluster.

Method 800, at 850, can comprise generating an exception report. At this point method 800 can end. The exception report can be related to performing manual healing of the second cluster mapping of the second portion of the real cluster. Moreover, the exception report can be based on the reconciling of the second cluster mapping. In an aspect, locking of the first portion generally cannot protect against all possible avenues of data loss during intra-cluster migration. As such, an exception report can allow for verification of an intra-cluster migration that is not complete. As an example, a zone supporting the first portion of the real cluster can become less accessible and a chunk of the first portion can therefore need to be recovered to provide access to data thereof. In this example, the chunk can be recovered from other chunks, e.g., a replicate chunk from another zone, via erasure coding recovery with other erasure coding chunks, via XOR recovery with other XOR chunks, etc. A recovered chunk can, for example, be unmigrated depending on the timing of the recovery, such as where the recovery takes longer than the remaining time needed to complete an intra-cluster migration, etc. The recovered chunk is also unlikely to be marked as deleted. In some aspects the chunk can be migrated and then the recovered chunk can be migrated, etc. It can be appreciated that there can be conditions that can result in inconsistencies between the relationships embodied in the locked first portion and correspondingly locked first mapping that in relation to the second portion and the second mapping. These inconsistencies can be indicated in an exception report and can enable manual healing of the inconsistencies. In an aspect, the manual healing can occur before or after the verification of the intra-cluster migration is committed. As an example, manual heal can occur prior to committing the verification such that the second mapping and the second portion can be considered complete. In another example, a manual healing can be performed after the verification is complete wherein the second mapping and the second portion can be considered sufficiently functionally operational but subject to an error that is to be fixed via manual healing. Of further note, some items of an exception report may never be fixed, for example, where the exception relates to data that is slated to be deleted before it is expected to be accessed, etc., e.g., the manual healing can be avoided or deferred where there can be allow likelihood of access to data before an associated error self-resolves via other operations.

Figure 9:
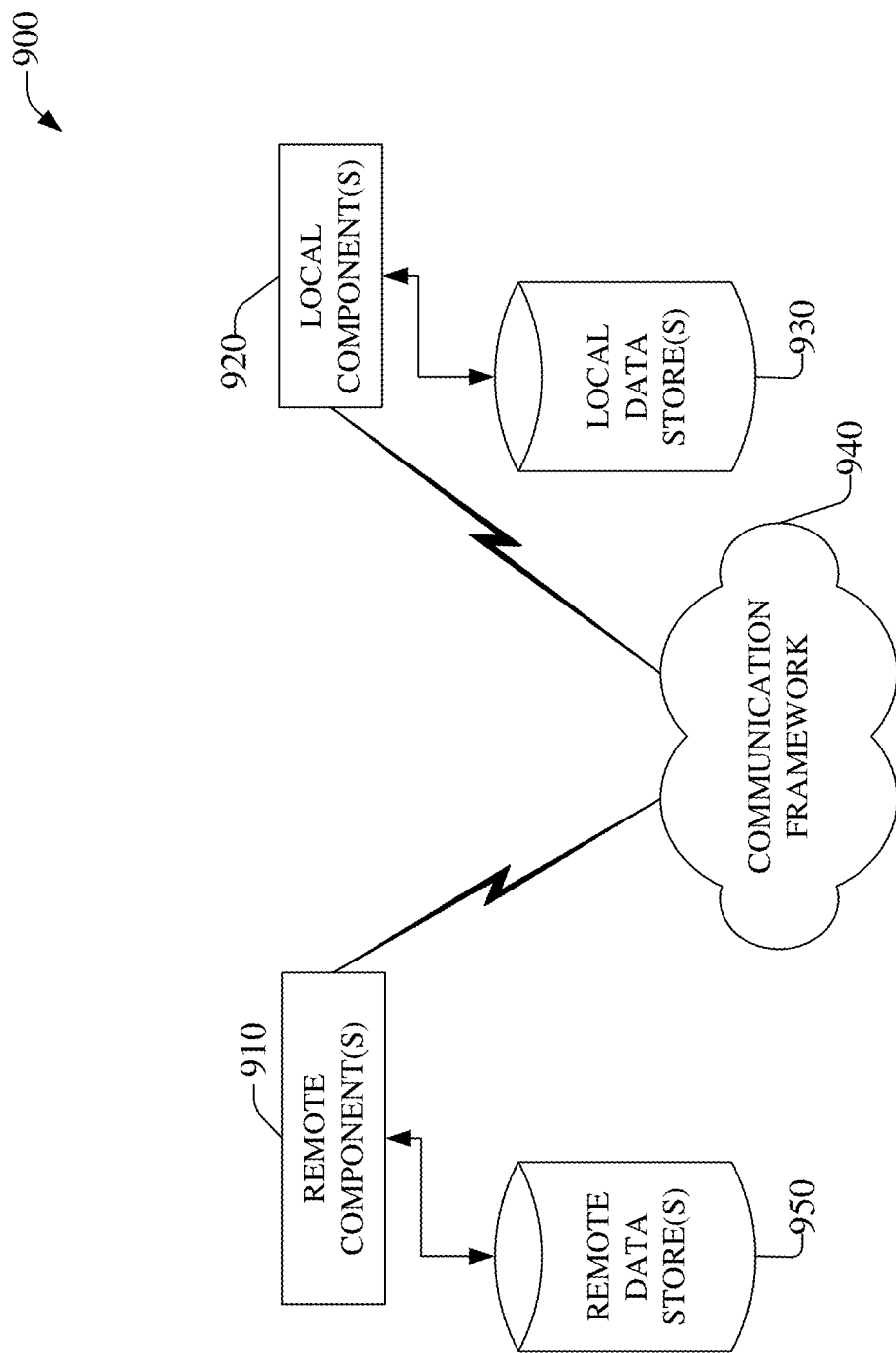
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located cluster storage device, e.g., embodied in a cluster storage construct, such as 140-148, 150-158, 130-138, 110-118, etc., connected to a local mapped cluster control component, e.g., embodied in a cluster storage construct, such as 140-148, 150-158, 130-138, 110-118, etc., via a communication framework, e.g., 940, etc. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local mapped cluster control component, e.g., embodied in a cluster storage construct, such as 140-148, 150-158, 130-138, 110-118, etc., connected to a remotely located storage devices via communication framework 940. In an aspect the remotely located storage devices can be embodied in a cluster storage construct, e.g., embodied in a cluster storage construct, such as 140-148, 150-158, 130-138, 110-118, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As an example, information corresponding to a mapped data storage location can be communicated via communication framework 940 to other devices, e.g., to facilitate access to a real data storage location, as disclosed herein.

Figure 10:
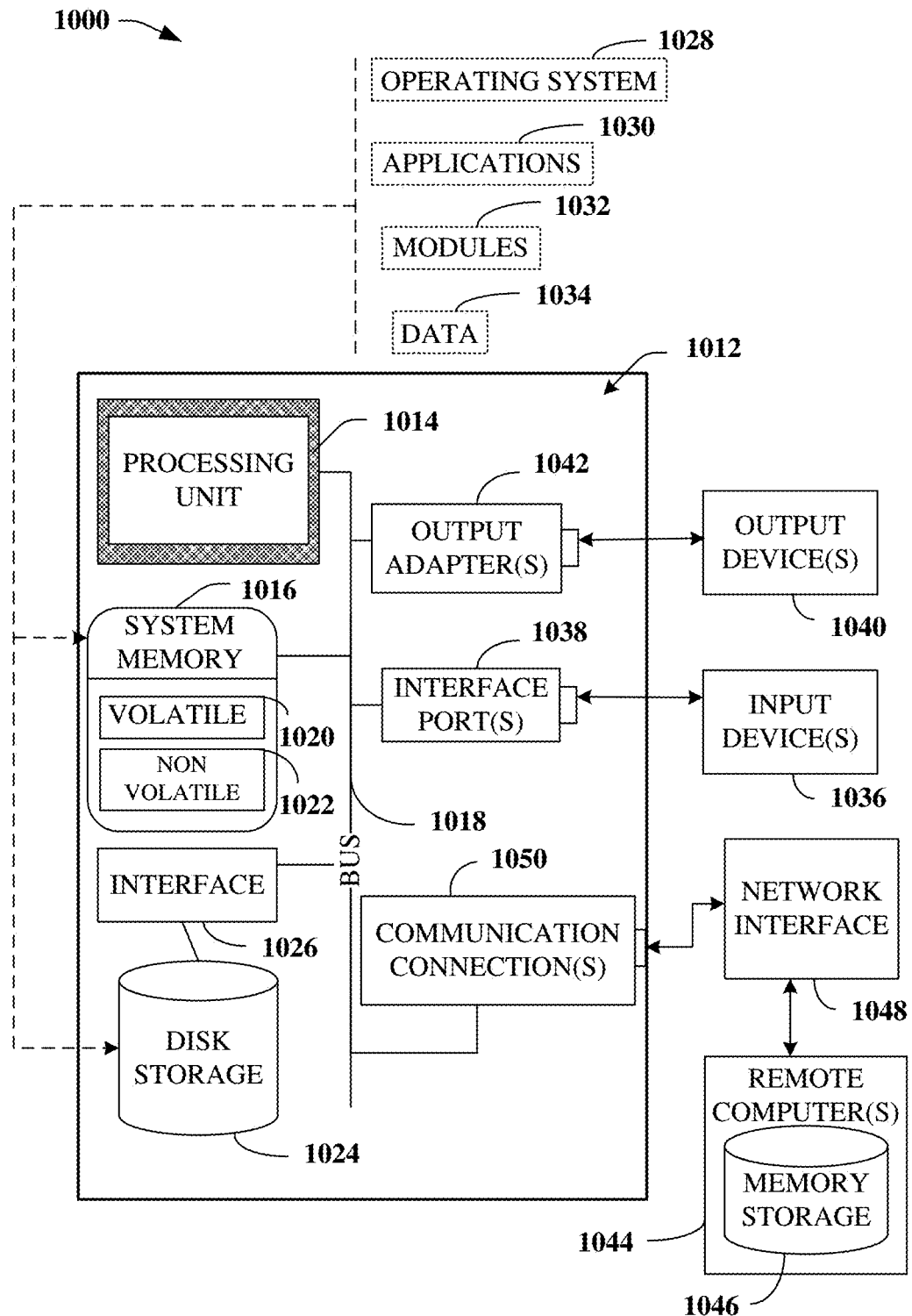
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in a cluster storage construct, such as 102, 202, etc., in mapped cluster control component, e.g., 220, etc., in a real node, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising marking a first chunk storage space and a corresponding first cluster table as read-only, then migrating a chunk between the first chunk storage space and a second chunk storage space. A second cluster table corresponding to the second chunk storage space can be updated in response to the migrating. Subsequently the second cluster table can be verified based on the first cluster table and an exception report based on the verifying can be generated, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (λ) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
in response to determining a condition of a cluster storage system satisfies a rule related to performing an intra-cluster migration, locking a first chunk storage space of a cluster storage system and locking a first cluster table corresponding to the first chunk storage space;
performing an intra-cluster migration of a chunk from the first chunk storage space to a second chunk storage space of the cluster storage system;
updating a second cluster table corresponding to the second chunk storage space based on the intra-cluster migration of the chunk; and
verifying the second cluster table and the second chunk storage space based on the first cluster table.

2. The system of claim 1, wherein the condition corresponds to addition of a node to the cluster storage system.

3. The system of claim 1, wherein the operations further comprise performing a garbage management process during the intra-cluster migration.

4. The system of claim 3, wherein the garbage management process comprises marking a chunk of the second cluster table with an indication corresponding to a chunk status.

5. The system of claim 4, wherein the chunk status is selected from a group of chunk statuses comprising a deleted indication, a recovered indication, and a recovered and deleted indication.

6. The system of claim 1, wherein the locking the first chunk storage space and the locking the first cluster table permit reading of data from chunks stored in the first chunk storage space.

7. The system of claim 1, wherein the locking the first chunk storage space and the locking the first cluster table restrict writing a chunk into the first chunk storage space.

8. The system of claim 1, wherein the locking the first chunk storage space and the locking the first cluster table restrict modifying a chunk stored in the first chunk storage space.

9. The system of claim 1, wherein the operations further comprise generating an exception report based on the verifying the second cluster table and the second chunk storage space.

10. The system of claim 9, wherein the operations further comprise correction of an exception of the exception report via human interaction.

11. The system of claim 1, wherein the operations further comprise, subsequent to the verifying, deletion or recovery of storage space of the first chunk storage space by the cluster storage system.

12. The system of claim 11, wherein the deletion of storage space comprises removal of a node of the cluster storage system.

13. The system of claim 1, wherein the first cluster table is in at least one tree chunk and wherein the at least one tree chunk is stored in the first chunk storage space.

14. A method, comprising:
prohibiting, by a processor of a real cluster storage system executing a first chunk storage space, storage of a first chunk to the first chunk storage space, wherein the first chunk storage space corresponds to a first cluster table;
updating, by the processor, a second cluster table in response to causing an intra-cluster migration of a second chunk stored by the first chunk storage space to a second chunk storage space of the real cluster storage system, wherein the second chunk storage space corresponds to the second cluster table; and
generating, by the processor, an exception report based on verifying the second cluster table based on the first cluster table.

15. The method of claim 14, further comprising performing, by the processor, a garbage management process during the intra-cluster migration of the second chunk from the first chunk storage space to the second chunk storage space.

16. The method of claim 14, further comprising receiving, by the processor, an instruction related to manual healing of an exception of the exception report.

17. The method of claim 14, further comprising, deleting, by the processor, storage space of the first chunk storage space, wherein the deleting is subsequent to the verifying the second cluster table.

18. A non-transitory machine-readable storage medium, comprising executable instructions that, when executed by a processor, facilitate performance of operations, comprising:
marking a first chunk storage space of a cluster storage system as read-only;
marking a first cluster table as read-only, wherein the first cluster table corresponds to the first chunk storage space;

migrating a chunk stored by the first chunk storage space to a second chunk storage space of the cluster storage system;

updating a second cluster table in response to the migrating, wherein the second chunk storage space corresponds to the second cluster table;

verifying the second cluster table based on the first cluster table; and communicating an exception report based on the verifying.

19. The non-transitory machine-readable storage medium of claim 18, wherein the operations further comprise performing a garbage management operation contemporaneously with intra-cluster migrating of the chunk between the first chunk storage space and the second chunk storage space.

20. The non-transitory machine-readable storage medium of claim 18, wherein the operations further comprise deleting storage space of the first chunk storage space subsequent to the verifying the second cluster table.

* * * * *